United States Patent
Lesesky et al.

(10) Patent No.: US 11,770,677 B1
(45) Date of Patent: Sep. 26, 2023

(54) ENHANCED SAFETY SYSTEMS AND METHOD FOR TRANSPORTATION VEHICLES

(71) Applicant: Spirited Eagle Enterprises, LLC, Farmington, MI (US)

(72) Inventors: Alan C. Lesesky, Charlotte, NC (US); Jerry K. Hubbell, Farmington Hills, MI (US); Ryan David Parks, Rock Hill, SC (US); Samuel Duke Drinkard, Gaston, SC (US); Keith Donadio, Wake Forest, NC (US)

(73) Assignee: Spirited Eagle Enterprises, LLC, Farmington, MI (US)

( * ) Notice: Subject to any disclaimer, the term of this patent is extended or adjusted under 35 U.S.C. 154(b) by 0 days.

(21) Appl. No.: 17/306,274

(22) Filed: May 3, 2021

Related U.S. Application Data

(63) Continuation of application No. 16/737,405, filed on Jan. 8, 2020, now abandoned.

(60) Provisional application No. 62/841,553, filed on May 1, 2019, provisional application No. 62/789,664, filed on Jan. 8, 2019.

(51) Int. Cl.
*H04W 4/02* (2018.01)
*H04W 4/42* (2018.01)
*H04W 4/20* (2018.01)
*H04W 4/48* (2018.01)

(52) U.S. Cl.
CPC ............ *H04W 4/023* (2013.01); *H04W 4/20* (2013.01); *H04W 4/42* (2018.02); *H04W 4/48* (2018.02)

(58) Field of Classification Search
CPC ......... H04W 4/023; H04W 4/20; H04W 4/42; H04W 4/48
See application file for complete search history.

(56) References Cited

U.S. PATENT DOCUMENTS

| | | | |
|---|---|---|---|
| 2007/0219685 A1* | 9/2007 | Plante | G07C 5/008 701/33.4 |
| 2010/0085215 A1* | 4/2010 | Doyle, III | G08G 1/127 455/456.1 |
| 2016/0052453 A1* | 2/2016 | Nalepka | B60R 1/00 348/148 |

* cited by examiner

*Primary Examiner* — Marisol Figueroa
(74) *Attorney, Agent, or Firm* — Schwartz Law Firm, P.C.

(57) ABSTRACT

A method for enhancing situational awareness in a transportation vehicle includes strategically locating sensory communication devices on the vehicle. The sensory communication devices are operatively connecting to a user network. At least one of the sensory communication devices is activated upon a triggering event. A vehicle data signal including vehicle information is transmitted from the activated sensory communication device to the user network. Using a computing device, the user network is accessed to receive the vehicle information transmitted by the activated sensory communication device.

1 Claim, 37 Drawing Sheets

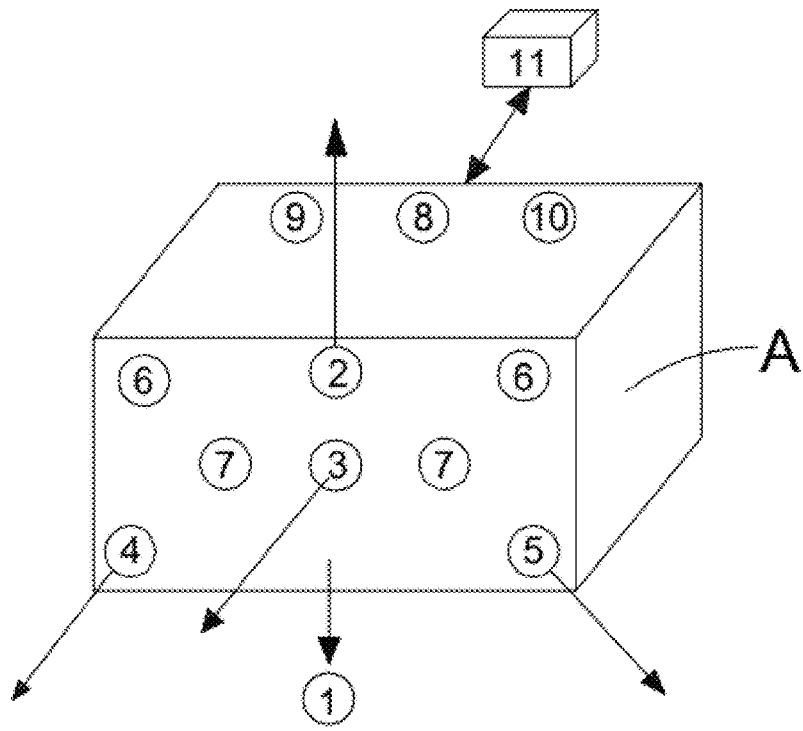

A. iSEE Safety Control Box
1. Doppler Radar 45° to Ground - Road Speed
2. Doppler Radar through Floor - Inside trailer Activity
3. Doppler Radar/Ultrasonic Sensor toward back of Trailer - Obstacle Warning and Back Up Distance
4. Doppler Radar/Ultrasonic Sensor - Left Side Obstacle Detection
5. Doppler Radar/Ultrasonic Sensor - Right Side Obstacle Detection
6. Amber LED Warning Lamps
7. Camera(s)
8. 3D XYZ Accelerometer - Records Date, Time, Hard Accelerations, Acceleration above Speed Limit
9. Blue Tooth Transceiver coupled with Antenna/Lamp
10. QR Code for auto-pairing with Smart Device (Back Up App, Blue Tooth, etc.)
11. Data BUS or NFC Transceiver: RS-485, SAE J1708, SAE J1939, CAN;
WiFi/BlueTooth Transceiver mounted on front of Trailer, i.e. SAE J560/1067 Nose Box, coupled (hardwired) to Trailer Data Bus; i.e. RS-485, CAN, SAE J1939, PLC SAE J2497, SAE J1708

Figure 1: iSEE Safety Control Box System

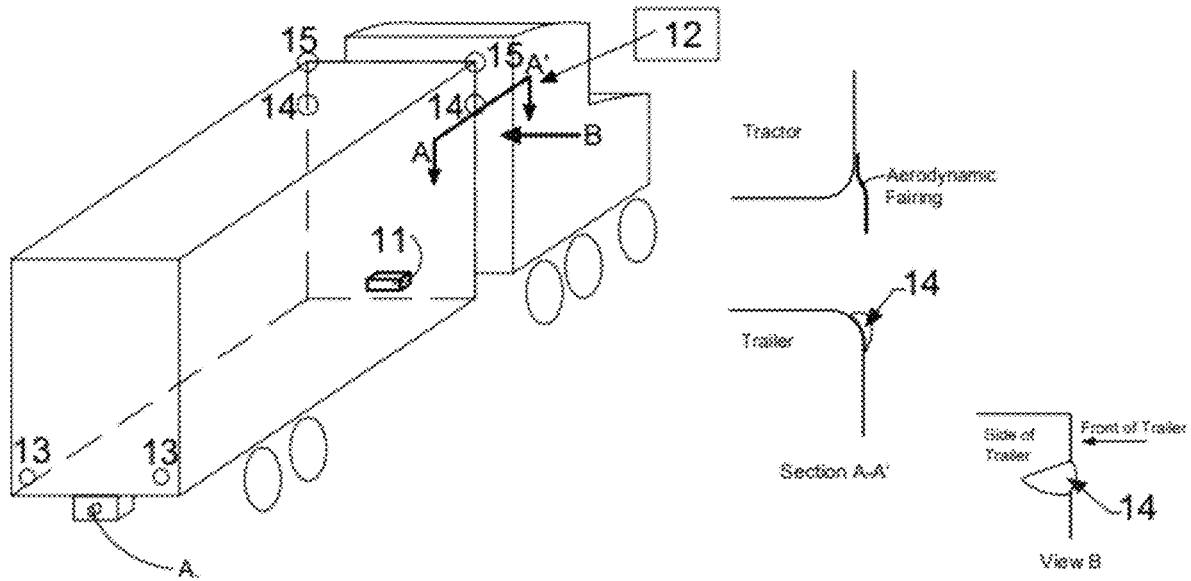

A - iSEE Safety Control Box Features:
11. Data BUS or NFC Transceiver: RS-485, SAE J1708, SAE J1939, CAN; WiFi/BlueTooth Transceiver mounted on front of Trailer, i.e. SAE J560/1067 Nose Box, coupled (hardwired) to Trailer Data Bus; i.e. RS-485, CAN, SAE J1939, PLC SAE J2497, SAE J1708
12. ELD (Electronic Driver Log) Device - -Driver Tablet/Mobile Device with Blue Tooth/WiFi App
13. Flashing Amber LED lights triggered with Vehicle Deceleration in excess of 4.5 m/sec² *
13. Flashing Amber LED lights when Vehicle speed is below 10 MPH, including stopped Vehicle
14. Back Up Distance Monitor Lamps viewed by Driver in Front of Trailer
15. Radar Warning (Blind Spots) on passenger and driver side shown by Amber Light on front of Trailer. 9: Alternative: Antenna on front of Trailer with WiFi/Blue Tooth Connection to Smart Device

* AASHTO (2001) references a value of 4.5m/sec². It was observed that drivers decelerate at a rate greater than 4.5m/sec² when decelerating for an unexpected condition.

Figure 2: iSEE Control Safety Box System

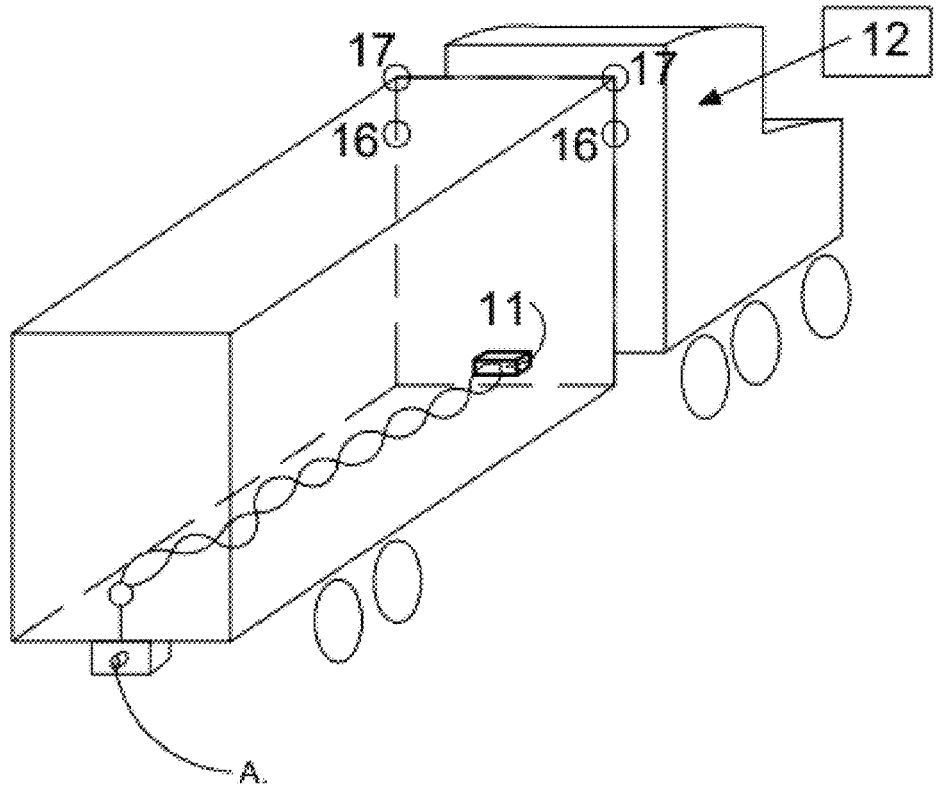

A - ISEE Safety Control Box Features:
11. Data BUS or NFC Transceiver: RS-485, SAE J1708, SAE J1939, CAN; WiFi/BlueTooth Transceiver mounted on front of Trailer, i.e. SAE J560/1067 Nose Box, coupled (hardwired) to Trailer Data Bus; i.e. RS-485, CAN, SAE J1939, PLC SAE J2497, SAE J1708
12. ELD (Electronic Driver Log) Device -Driver Tablet/Mobile Device with Blue Tooth/WiFi App
16: Back Up Distance Monitor Lamps viewed by Driver in Front of Trailer
17: Radar Warning (Blind Spots) on passenger and driver side shown by Amber Light on front of Trailer. 9: Alternative: Antenna on front of Trailer with WiFi/Blue Tooth Connection to Smart Device Figure 3: iSEE Control Safety Box System

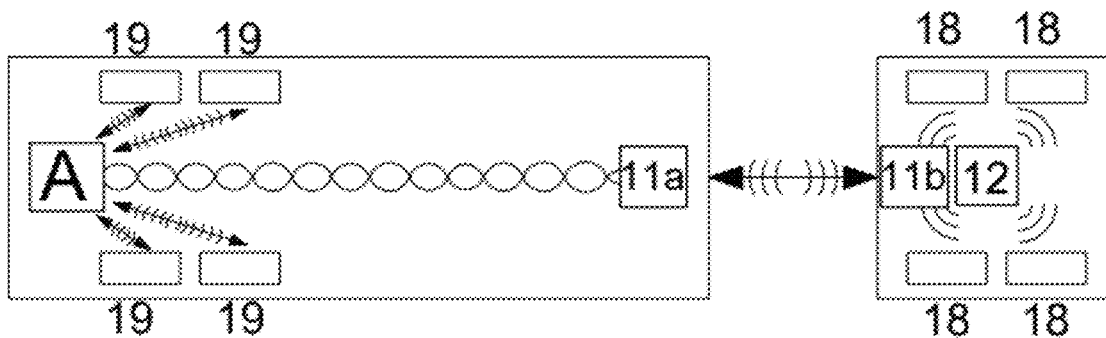

A - iSEE Safety Control Box Features:
A. iSEE Safety Control Box, Transceiver(s), Trailer I.D., Blue Tooth/WiFi, RS-485, Data Bus
11a. Data BUS Transceiver (Trailer) - RS 485, SAE J1708, SAE J1939, CAN; WiFi/BlueTooth Transceiver mounted on front of Trailer, i.e. SAE J560/1067 Nose Box, coupled (hardwired) to Trailer Data Bus; i.e. RS 485, CAN, SAE J1939, PLC SAE J2497, SAE J 1708
11b. Data BUS Transceiver (Tractor)
12. ELD (Electronic Driver Log) Device -Driver Tablet/Mobile Device with Blue Tooth/WiFi App
18. Tractor: Wireless, Blue Tooth/WiFi Modules, Back-up Lamps, Trailer Lights, Inside (i.e. - Seat: Health Data)
19. Trailer: Wireless Sub-systems, Air Pressure, Reefer, Brake Stroke, Tire Pressure, Wheel Hub, Temperature Figure 4: iSEE Control Safety Box System

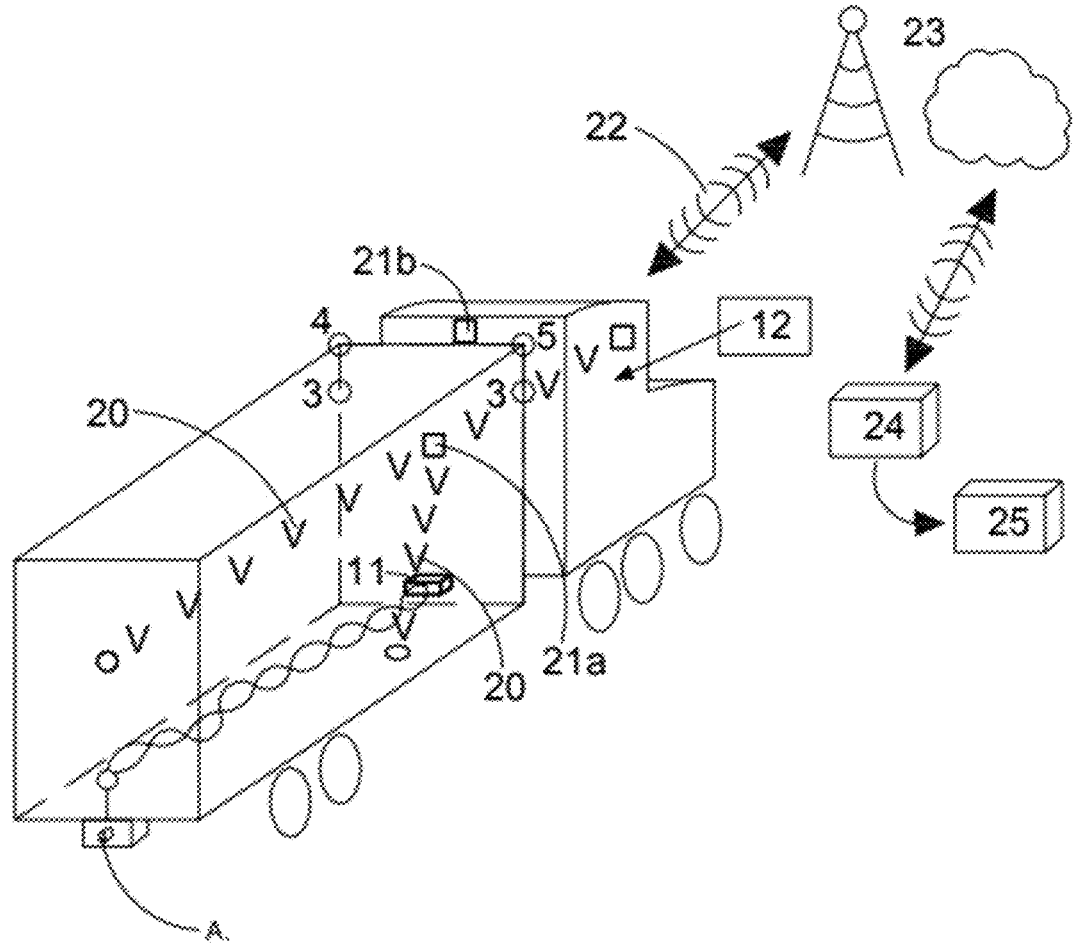

A - iSEE Safety Control Box Features:
12. ELD (Electronic Driver Log) Device -Driver Tablet/Mobile Device with Blue Tooth/WiFi App
20. Video Data hardwired to Transmitter to Cab Receiver
21a. Video Wireless Transmitter on Trailer
21b. Video Wireless Receiver on Tractor
22. Cellular Communication - ELD Platform
23. Cloud Storage- Home Office Data Base: Video, Sensor Data, Crash Data, etc.
24. Home Office
25. Blockchain System/Process Figure 5: iSEE Control Safety Box System Video Data

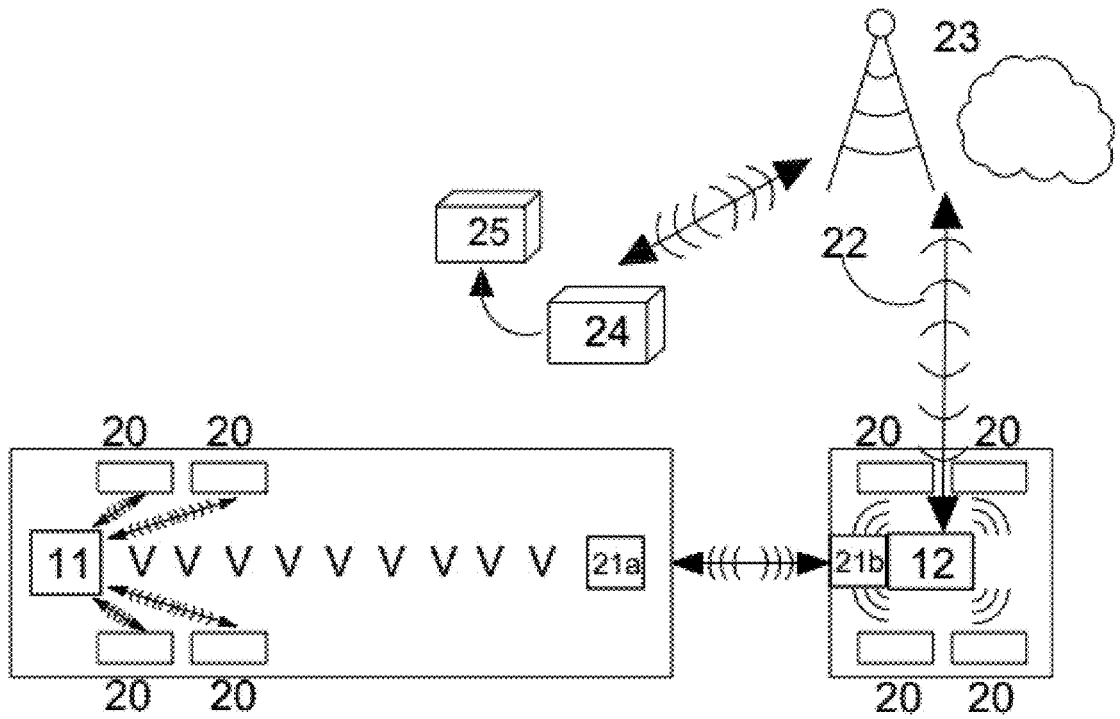

A - iSEE Safety Control Box Features:
11. Data BUS Transceiver - RS 485, SAE J1708, SAE J1939, CAN; WiFi/BlueTooth Transceiver mounted on front of Trailer, i.e. SAE J560/1067 Nose Box, coupled (hardwired) to Trailer Data Bus; i.e. RS 485, CAN, SAE J1939, PLC SAE J2497, SAE J 1708
12. ELD (Electronic Driver Log) Device -Driver Tablet/Mobile Device with Blue Tooth/WiFi App
20. Video Data hardwired to Transmitter to Cab Receiver
21a. Video Wireless Transmitter on Trailer
21b. Video Wireless Receiver on Tractor
22. Cellular Communication - ELP Platform
23. Cloud Storage- Home Office Data Base: Video, Sensor Data, Crash Data, etc.
24. Home Office
25. Blockchain System/Process Figure 6: iSEE Control Safety Box System
Video Data 12. ELD Device/Mobile Device/Tablet
26. Video/Mirror Display mounted in cab like in a passenger car
26a. LED Map Light
27. Bluetooth
29. Tractor Cab
30. Speaker/Voice
31. APP
33. Navigation Maps
34. GPS Network
35. Cellular Communication to Cloud

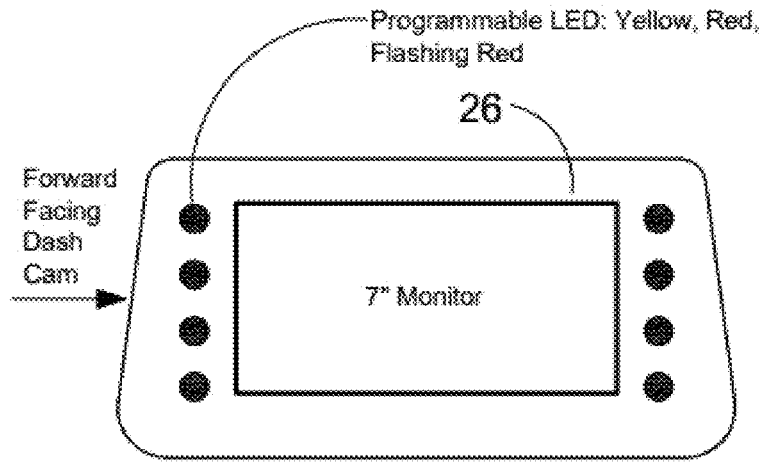

Camera
Capture Images
   -Rear and Front View Power

Housing
Modular - Extrusions with Moulded End Cap
End Caps - Angles or Flat

Sensors
Sonic or Radar

Wireless
TX - Transmit
TR - Receiver

Monitor
7"LCD
Housiing (Mirror Shape)
Power

DVR
Record all Cameras
Images 100% of the time

26. Video/Mirror Display

When the iSEE Safety Control Box contains a rear facing camera system, a monitor can be mounted in the tractor, on the windshield, and serve as a rearview "mirror" equivalent. All the warnings and/or data sent to the ELD monitor can be duplicated or replaced by the mirror/monitor.

A forward facing camera could be incorporated to supplement the post event information contained in the internal DVR.

Figure 8 - iSEE Mirror/Monitor

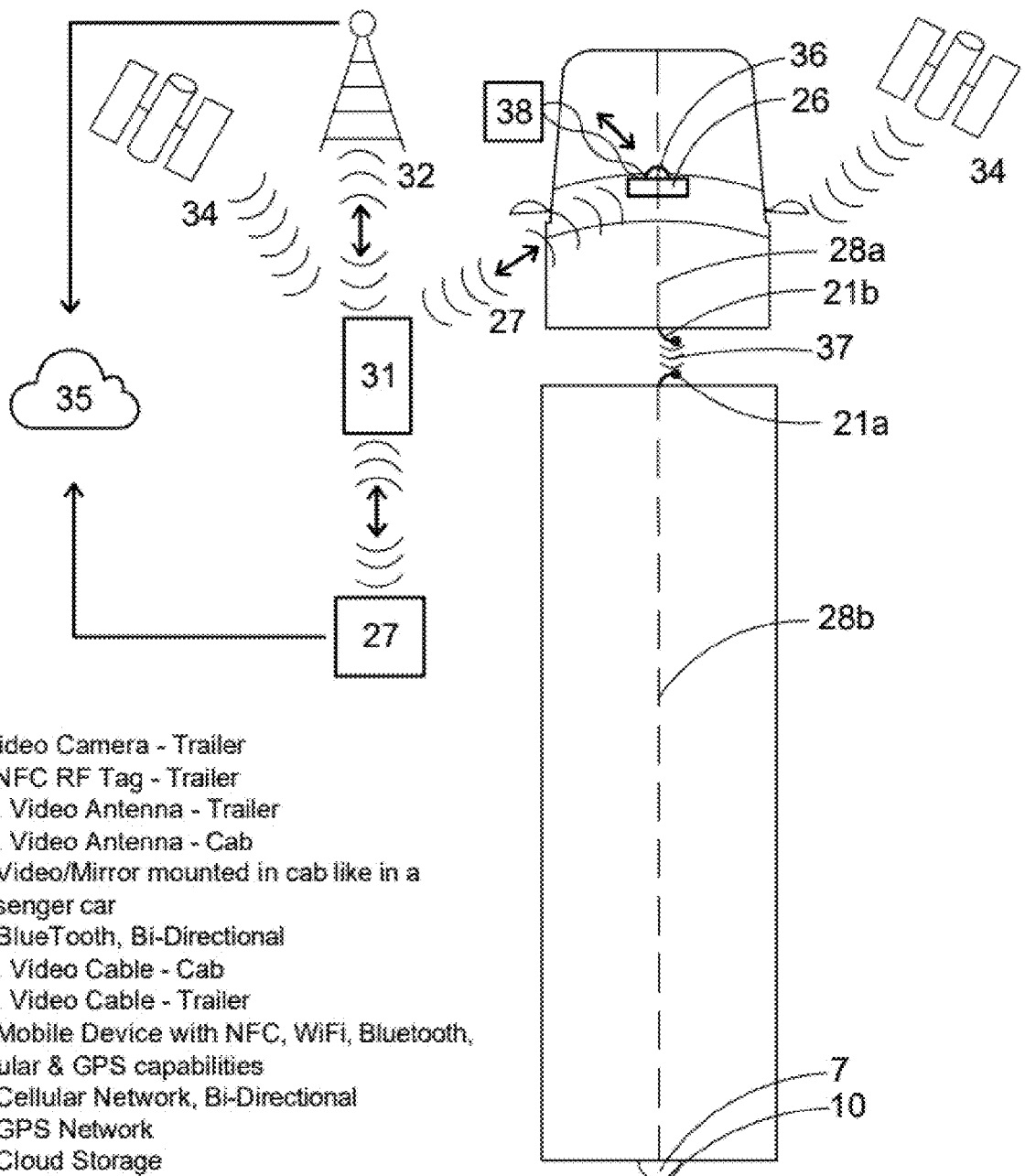

7. Video Camera - Trailer
10. NFC RF Tag - Trailer
21a. Video Antenna - Trailer
21b. Video Antenna - Cab
26. Video/Mirror mounted in cab like in a passenger car
27. BlueTooth, Bi-Directional
28a. Video Cable - Cab
28b. Video Cable - Trailer
31. Mobile Device with NFC, WiFi, Bluetooth, Cellular & GPS capabilities
32. Cellular Network, Bi-Directional
34. GPS Network
35. Cloud Storage
36. Dash Cam - Cab
37. RF Link between Tractor and Trailer
38. Vehicle Data Bus, Bi-Directional

Figure 9

A. iSEE Safety Control Box
11a. Trailer Data Bus Transceiver (iHub)
11b. Tractor Data Bus Transceiver (iBridge)
12. ELD (Electronic Log Device)

11b. Tractor Data Bus Transceiver (iBridge)
12. ELD Device (Electronic Driver Log)
11c. Various "Smart" components located in the tractor that transmit data to 11b (iBridge), that combined with data received from 11a (iHub), is transmitted to the ELD device thereby sending all the tractor and trailer information to the infrastructure.

40. Hitch Camera - Rear View

40. Hitch Camera - Rear View
41. Camera mounted to outboard end of ICC bumper

40. Mounted Camera (Rear View)
42. Trailer Hitch with Ball
43. Additional Mount
44. Locking Pin Hole
45. Mounted Camera (Angled View)
46. Pivot Adapter
47. Mounted Camera (Brackets with Locking Pin Hole allows camera to be pivoted for multiple uses/views)

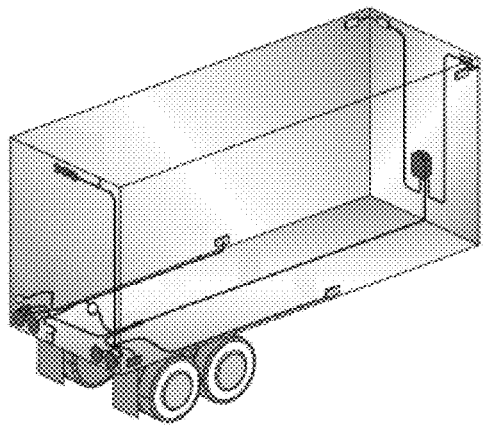
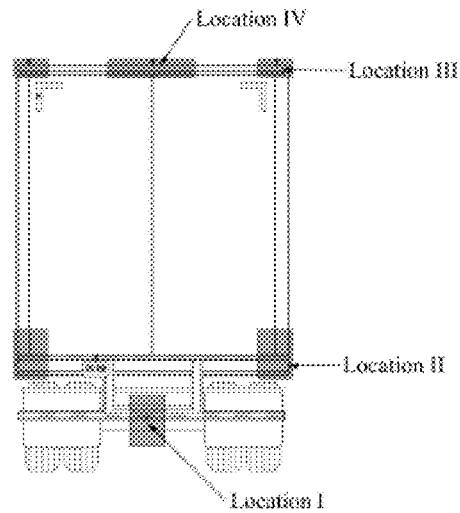

RIGHT REAR QUARTER VIEW
POWER SOURCES

REARVIEW LOCATION OPTIONS

REARVIEW LOCATION OPTIONS

Location I     iHitch Camera Housing on ICC Bumper

Location II     Running T/L with Integral Camera on Lower Rear Corners of Trailer Location III     Marker Lamps with Integral Cameras on Upper Rear Corners of Trailer Location IV     Upper ID Bar with Integral Cameras in Outboard Marker Lamps located at Center of Upper Trailer Header

POWER SOURCES

Location I     Pigtail Connected to Special IN/OUT Connector for Running Lights

Location II     Integral with Running Lights

Location III     Integral with Corner Marker Lamps

Location IV     Integral with Upper ID Bar

Figure 17

CAMERA LOCATION ALTERNATIVES

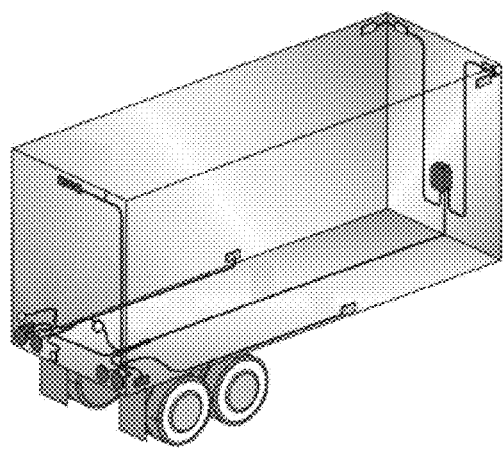
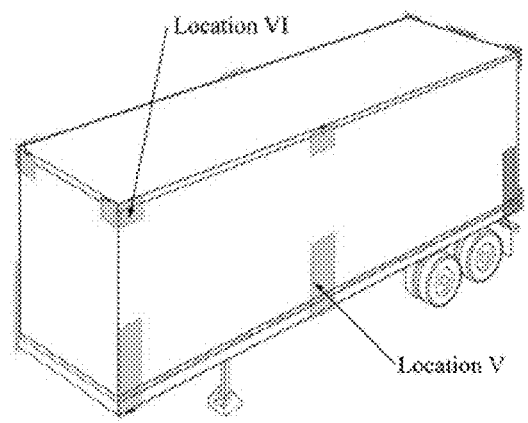

RIGHT REAR QUARTER VIEW
POWER SOURCES

LEFT FRONT QUARTER VIEW
SIDEVIEW LOCATION OPTIONS

SIDEVIEW LOCATION OPTIONS

Location V   Intermediate Side Marker Light with Integral Camera on Lower Middle of Side Trailer Location VI  Front Side Marker Light with Integral Camera on Upper Front Corner of Trailer

POWER SOURCES

Location V   Integral with Intermediate Side Marker Lamp

Location VI  Integral with Front Side Marker Lamp

Figure 18

Figure 23: Vehicle Enhanced Video Sensor Information to Driver with Cloud Backup A. iSEE Safety Control in Step Format
67. Camera (Regular, Infrared or Video)
68. Infrared LED Lights
69. Stop Lights
70. Magnetic Blocks to secure iSEE Box to ICC Bumper or other metallic structure
71. On/Off Control Lever

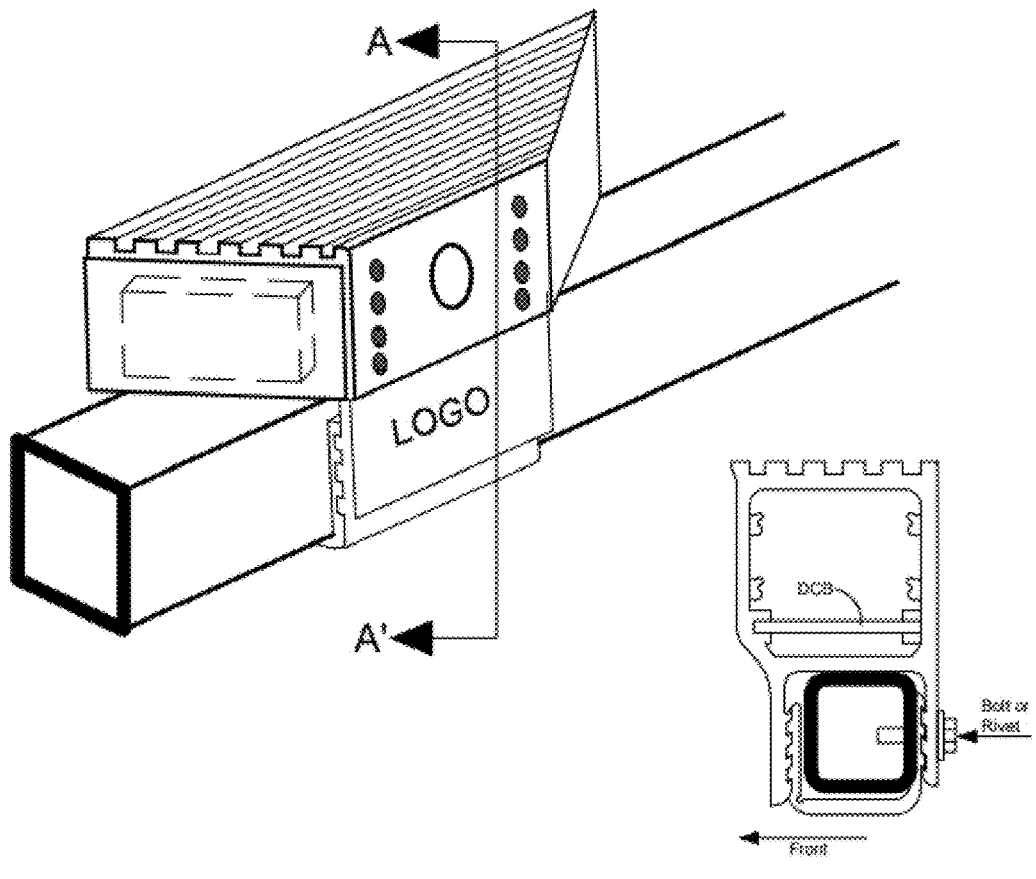

Cross-Section A-A' (typ.)

The Housing for the iSEE Safety Control Box can be made of Extrusions and cut in various positions (angles or perpendicular) depending on the selection of cameras, sensors, radar, lamps, etc. chosen by the customer. One example, shown above, would be mounted on the rear under-ride bar of the trailer and could be used as a step.

Figure 25 - iSEE Safety Control Box Housing Alternative

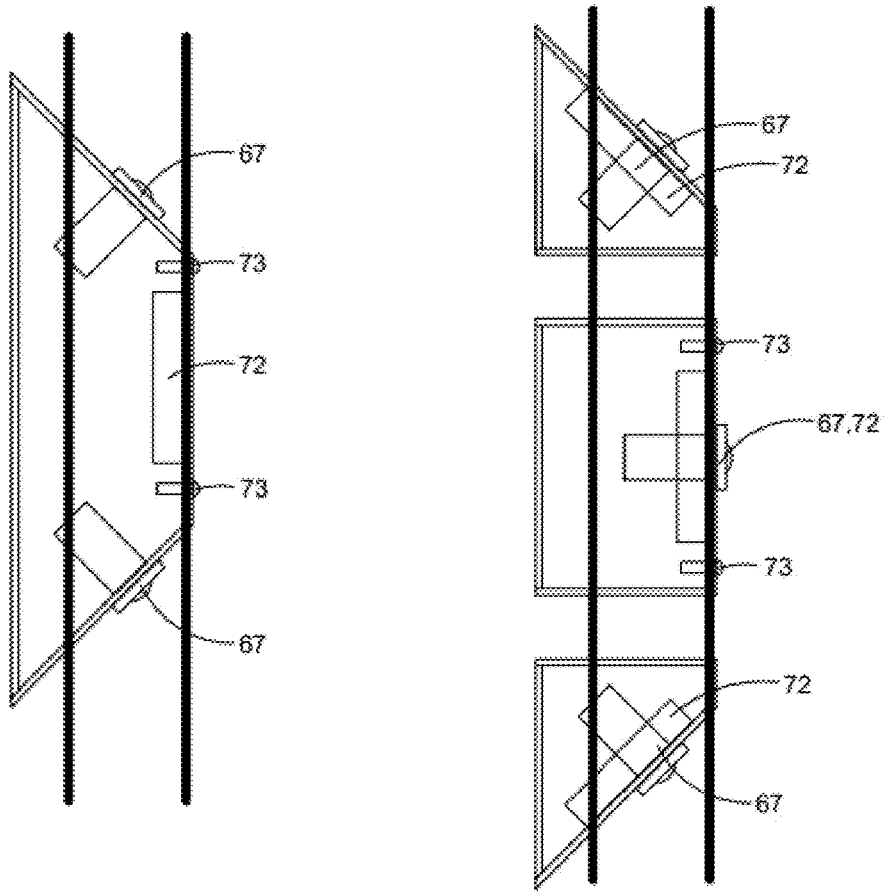

One configuration of the housing, using extrusions, is shown here with angled end pieces for cameras to obtain a full rear view for transmission to the driver (180° plus)

The extrusions and end pieces can be configured in various modules to house the specific features and components desired for a particular application.

A. iSEE Safety Control Box Configurations
67. Camera(s) - Regular or Infrared
72. Radar
73. LED Lights Figure 26 - iSEE Safety Control Box Housing Alternatives

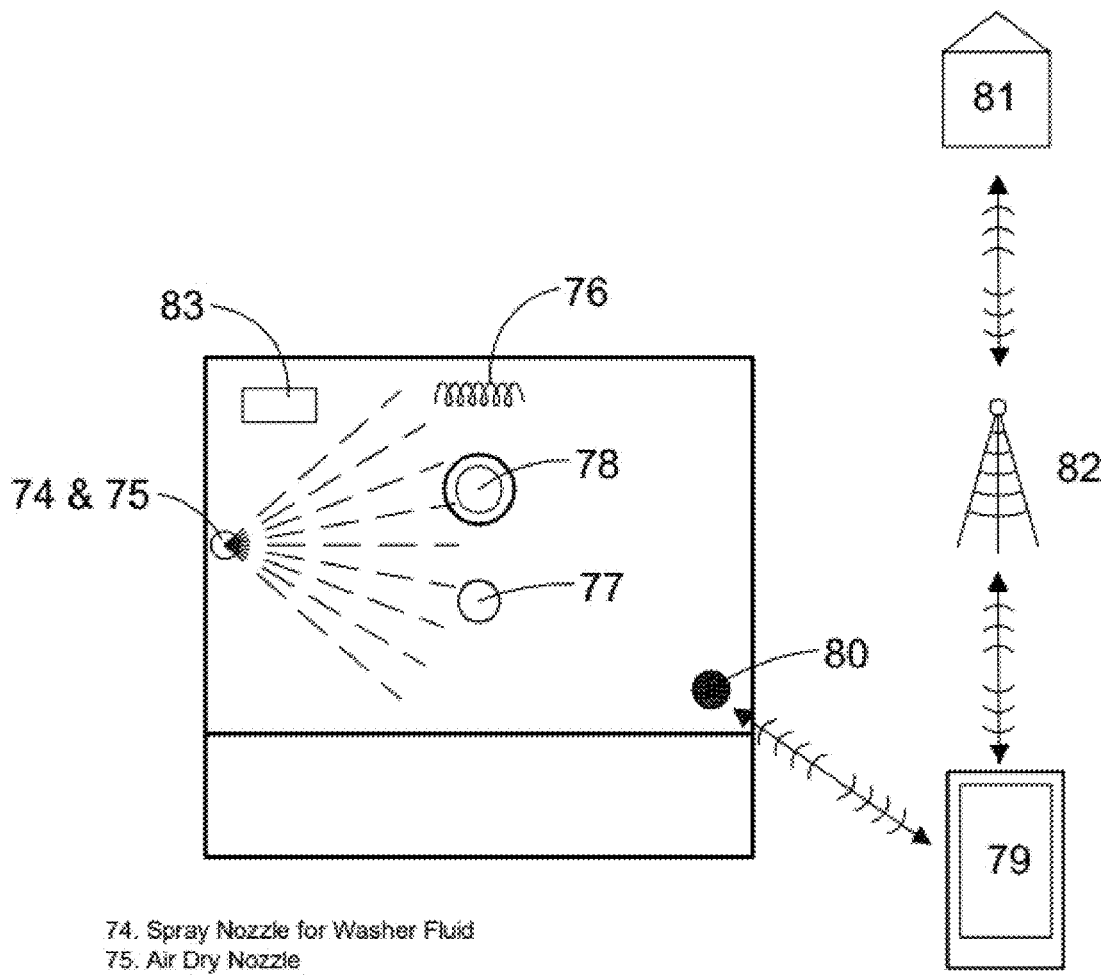

74. Spray Nozzle for Washer Fluid
75. Air Dry Nozzle
76. Heating Coil
77. Optic Window
78. Camera IR Lighting, Sonic Sensor, LIDAR, Infra-Red, Lights, Lamps, etc. (In any Sensor and/or Device where observation affects functional effectiveness)
79. Mobile Device, ELD Tablet, App
80. BLE (BlueTooth) Transceiver
81. Back Office
82. Telematics (Cellular, Satellite, etc.)
83. Microprocessor, Memory Notes: 74 & 75 are an Integrated Nozzle with Check Valve to measure Washing Fluid Levels
- BlueTooth App automatically cleans Cameras, especially in hard to reach places, i.e. Top of Trailer, Tractor, etc. App is also pertinent to keeping Cameras clean in Autonomous Vehicles - can be automatic or cleaned by Back Office

Figure 27

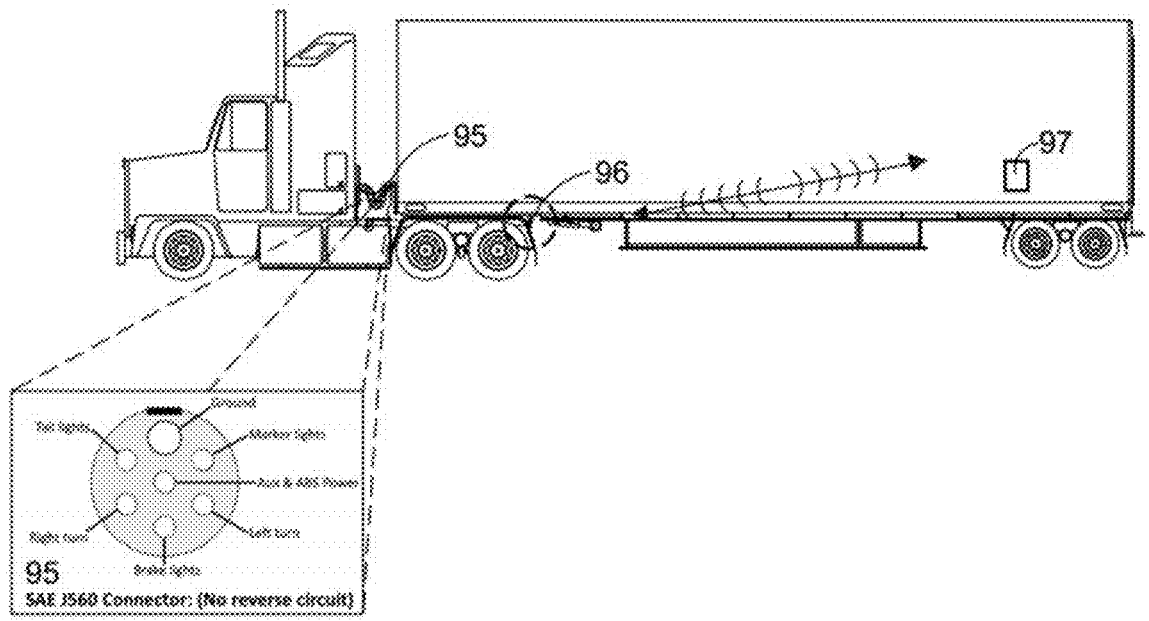

95. SAE J560 Connector
96. Tractor Combination Lamp Wireless Transceiver: Run, Brake, Turn, Backup
97. Trailer Lamp Wireless Transceiver: Marker Circuit, Brake, Turn Circuit (Auxillary PIN, Marker Circuit Power)

NOTE: Auto-pairing
   Tractor Turn And/ Tractor Brake And/ Tractor Run Lights
   Trailer Turn Or Trailer Brake Or Trailer Run Lights Figure 33: SEE Wireless, Self-Pairing, Tractor/Trailer Lamp Bridge System The diagram below shows an example of using a tractor lighting circuit and a trailer lighting circuit for automatic pairing electronic modules using an active high signal and the duration (period). Time tractor and time trailer the same pair

ENHANCED SAFETY SYSTEMS AND METHOD FOR TRANSPORTATION VEHICLES

TECHNICAL FIELD AND BACKGROUND OF THE DISCLOSURE

The principal point of the heavy truck industry is to transfer goods from point "A" to point "B" in the most safe and economical method possible. The trailer is a key part of this business with the size limited by regulations. The maximum length in the North American market being 53 feet, typically 8 foot 6 inches wide and 9 ft. high. Typical trailer capacity is 3,489 cu. ft. Moving this large container and getting the contents of the trailer to its destination as efficiently as possible has been the subject of much research & development in the heavy truck industry. Unfortunately, most of the advanced technology has been with the tractor (e.g. aerodynamics, fuel economy, advanced driver-assist systems (ADAS), electronic logging devices (ELD), etc.).

A recent effort (FMCSA-2010-0167) to improve safety is the mandated use of Electronic Logging Devices (ELD) to monitor the driver's hours of service (HOS). The advent of ELD technology in heavy truck now introduces a common communication platform between the tractor, the trailer, and the infrastructure.

This disclosure introduces inventions that collect important data/information from the trailer; eliminate the vision blockage of the trailer; feed these images and information to the tractor for the driver & via ELD technology to the infrastructure; and automatically keep vision and sensor devices clear of obscuration.

Specifically, this disclosure defines a safety control box at the rear of the trailer; a data bus transceiver at the front of the trailer; a data bus transceiver in the Tractor; a driver rear view mirror/monitor video method & system; and an automatic device cleaning method & system.

The objective of these inventions is to provide the driver with the information needed for safety & efficiency and the fleet with information regarding the driver and the trailer needed for effective control and monitoring. An added benefit is the ability to keep the customer informed of real time load status.

The rearview video system could stand-alone and not be integrated in the safety control box. This dedicated system incorporates a camera and smart tag assembly within an internal cavity defined by a vehicle or trailer hitch (commonly a 2 inch or 1¼ inch receiver). In one embodiment, the smart tag assembly comprises that disclosed in International PCT Patent Application No. PCT/US2015/019675 entitled "SMART TAG ASSEMBLY FOR MOUNTING ON AN OBJECT TO BE TRACKED"; Publication No. WO 2015/138431. The complete disclosure of this publication is incorporated by reference herein.

The exemplary hitch camera (or dual cameras) may comprise a wireless CCTV video camera, IP camera, or other such device (wireless or hardwired) adapted for capturing audio, video, and/or imagery data in and around the vehicle. The hitch camera may be web-enabled, and may comprise a transceiver and flash memory for software upgrades, troubleshooting, and the like. The hitch camera may be operatively aligned or "paired" with the vehicle data bus (e.g., power line carrier or "PLC", SAE J2497) and one or more vehicle sensors including, for example, ABS braking sensors, vehicle turn signal sensors, headlight sensors, windshield wiper sensors, safety air bag sensors, transmission gear sensors, speedometer sensor, odometer sensor, clock sensor, steering wheel position sensor, sensors indicating position of tractor in relation to trailer, engine and ambient temperature sensors, distance and motion sensors, battery sensors, tire sensors, seat-belt restraint sensors, and others. The vehicle sensors may comprise or utilize transceivers, transmitters or other means for communicating their state or condition directly to the paired hitch camera, or to a central onboard wireless access point (WAP) in the cab of the vehicle (e.g., Electronic On Board Recorder, Electronic Logging Device per FMCSA 49 CFR of the FMCSRs). The onboard access point cooperates with an onboard router and transceiver (or modem) to connect the hitch camera and vehicle sensors to a local area user network. The modem may include bridge and/or repeater modes. The connected hitch camera and/or sensors may be hardwired to the onboard access point via existing vehicle data bus (using technology described in prior U.S. Pat. No. 7,817,019), or may connect wirelessly using Wi-Fi, BLUETOOTH, Z-WAVE, or related standards. The vehicle data bus may communicate with the access point, onboard recording device, and vehicle systems or subsystems such as ABS braking system, engine, transmission, and tire modules using SAE, ISO, LIN (Local Interconnect Network), or CAN (Controller Area Network) standards (e.g., SAE J1708/1587, SAE J1939, SAE J1850, SAE J2497[PLC], and RS232). The complete disclosure of the aforementioned prior patent is incorporated by reference herein. The onboard access point may communicate with the hitch camera and vehicle sensors located within a radius of more than 100 m.

The user connects to the local area network using a mobile (e.g., web-enabled) or dedicated computing device. The dedicated computing device may comprise a display permanently mounted or integrated within the vehicle cab. Examples of mobile computing devices include a laptop computer, Netbook, tablet computer, cellular telephone, smartphone, PDA, and others. In one exemplary implementation, the computing device automatically pairs with the hitch camera and vehicle sensors at vehicle start-up, and automatically connects the driver or other user to the network. Alternatively, in web-based implementations, the user may first be required to login to a designated user account with an authorization code, user ID, password, or the like. One specific example of a suitable mobile computing device is described further below. In the user network, the computing device, hitch camera, and vehicle sensors may communicate with each other via PLC (or other vehicle data base) and wireless mechanism (e.g., Wi-Fi, BLUETOOTH, Z-WAVE, 433 MHz) in a secured closed-loop system. Once connected to the user network, a software application (e.g., mobile app) provides a dashboard-centric graphical interface on a display screen with icon tabs representing the hitch camera and each of the vehicle sensors. The hitch camera may also be manually activated. Manually clicking an icon tab for a particular device (e.g., video camera) provides a realtime view of the environmental area on which the hitch camera is focused. The software application allows the user to drill down from the dashboard into the various network connected devices and sensors to make desired pairings and changes to existing pairings. The inclusion of GPS technology provides valuable context to gathered information, allowing a history of video and sensor information to be linked to a precise location; this record could be key in forensic accident reconstruction efforts and in driver analysis. GPS also provides an additional source for time, distance, and speed data to be drawn from. The CCTV hitch camera may incorporate audio surveillance microphones for simultaneously transmitting environmental noises to the driver, and may also comprise Digital Video Recorders for recording and storing the captured digital audio, and video images. Alternatively, the captured vehicle data may be recorded and stored on a remote server or on an onboard recorder, such as that described in prior U.S. Pat. No. 8,032,277—the complete disclosure of which is incorporated herein by reference. The CCTV hitch camera may also support recording directly to network-attached storage devices, and sufficient internal flash for completely stand-alone operation. The hitch camera may also comprise a housing or cover equipped with a camera wash nozzle, dryer, and defroster. In other embodiments, the exemplary hitch camera may comprise closed circuit digital photography (CCDP), or other IP-based digital still cameras.

The exemplary CCTV hitch camera may also utilize Video Content Analysis (VCA) technology for automatically analyzing video to detect and determine temporal events not based on a single image. Using VCA the hitch camera can recognize changes in the environment and identify and compare objects in a database using size, speed, and color. The hitch camera's actions can be programmed based on what it is "seeing".

The individual user network in the exemplary implementation may be combined with other user networks, and centrally monitored and accessed using a network protocol called "Television Network Protocol." Each user network (LAN) is an integrated system allowing users at any location (outside the vehicle) to connect remotely from the Internet and view what the hitch camera is viewing remotely. All online communications may be encrypted using Transport Layer Security (TLS), Secure Socket Layer (SSL) or other cryptographic protocol.

Exemplary Mobile Computing Device and Software

The exemplary computing device may incorporate or comprise any general or specific purpose machine with processing logic capable of manipulating data according to a set of program instructions. In one exemplary embodiment, the computing device comprises a mobile tablet such as the iPAD®2 by Apple Inc using iOS 4.3.3. Current product specifications for the iPAD®2 are copied below.

Display 9.7-inch (diagonal) LED-backlit glossy widescreen Multi-Touch display with IPS technology 1024-by-768-pixel resolution at 132 pixels per inch (ppi)

Fingerprint-resistant oleophobic coating

Support for display of multiple languages and characters simultaneously iPad 2 Processor Apple A5 Processor 1 GHz dual-core Apple A5 custom-designed, high-performance, low-power system-on-a-chip iPad 2 Internal Memory/Storage Capacity For both iPad Wi-Fi and iPad WiFi+3G:

16 GB, 32 GB or 64 GB internal flash memory (or flash drive)

Wireless

Wi-Fi (802.11a/b/g/n)

Bluetooth 2.1+EDR technology

The exemplary tablet includes card slots for removable flash and SIM cards, and may have up to 32 GB or more of non-volatile internal memory. One or more of the flash and SIM cards and internal memory may comprise computer-readable storage media containing program instructions applicable for effecting the present method for enhancing situational awareness in a transportation vehicle, described further below. As generally known and understood in the art, the flash card is an electronic flash memory data storage device used for storing digital information. The card is small, re-recordable, and able to retain data without power. For example, Secure Digital (SD) is a non-volatile memory card format developed by the SD Card Association for use in portable devices.

The SIM card contains an integrated circuit that securely stores the service-subscriber key (IMSI) used to identify a subscriber on mobile devices including the exemplary tablet. SIM hardware typically consists of a microprocessor, ROM, persistent (non-volatile) EEPROM or flash memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the mobile device. The STK allows a mobile operator (such as a wireless carrier) to create/provision services by loading them into the SIM without changing other elements of the mobile device. One convenient way for loading applications to the SIM is over-the-air (OTA) via the Short Message Service (SMS) protocol.

Secure data or application storage in a memory card or other device may be provided by a Secure Element (SE). The SE can be embedded in the logic circuitry of the tablet (or other mobile device), can be installed in a SIM, or can be incorporated in a removable SD card (secure digital memory card), among other possible implementations. Depending on the type of Secure Element (SE) that hosts an applet, the features implemented by the applet may differ. Although an SE is typically Java Card compliant regardless of its form factor and usage, it may implement features or functions (included in the operating system and/or in libraries) that are specific to that type of SE. For example, a UICC (Universal Integrated Circuit Card) may implement features that are used for network communications, such as text messaging and STK, whereas in certain embedded SE devices, these features may not be implemented.

Additionally, to identify a user's tablet (or other mobile device), a unique serial number called International Mobile Equipment Identity, IMEI, may be assigned to the device. As known by persons skilled in the art, IMEI is standardized by ETSI and 3GPP, and mobile devices which do not follow these standards may not have an IMEI. The IMEI number is used by the network to identify valid mobile devices. IMEI identifies the device, not the user (the user is identified by an International Mobile Subscriber Identity, IMSI), by a 15-digit number and includes information about the source of the mobile device, the model, and serial number.

The exemplary tablet may also combine A-GPS and other location services including Wi-Fi Positioning System and cell-site triangulation, or hybrid positioning system. Mobile device tracking tracks the current position of a mobile device, even when it is moving. To locate the device, it must emit at least the roaming signal to contact the next nearby antenna tower, but the process does not require an active call. GSM localization is then done by multilateration based on the signal strength to nearby antenna masts. Mobile positioning, which includes location-based service that discloses the actual coordinates of a mobile device bearer, is a technology used by telecommunication companies to approximate where a mobile device, and thereby also its user (bearer), temporarily resides.

The exemplary tablet may incorporate a capacitive touch-screen. As generally known and understood in the art, capacitive touchscreens tend to be more accurate and responsive than resistive screens. Because they require a conductive material, such as a fingertip, for input, they are not common among stylus-using Tablet PCs but are more prominent on the smaller scale tablet computer devices. In alternative embodiments, the tablet may comprise a resistive touchscreen. Resistive touchscreens are passive and can respond to any kind of pressure on the screen. They allow a high level of precision (which may be needed, when the touch screen tries to emulate a mouse for precision pointing, which in Tablet personal computers is common). Because of the high resolution of detection, a stylus or fingernail is often used for resistive screens. The exemplary touchscreen technology may also include palm recognition, multi-touch capabilities, and pressure sensitive films.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the invention or to imply that certain features are critical, essential, or even important to the structure or function of the invention. Rather, these terms are merely intended to highlight alternative or additional features that may or may not be utilized in a particular embodiment of the present invention.

The present disclosure comprises an enhanced trailer information, an automatic device cleaning and an enhanced-vision video display systems and methods for transportation vehicles. In summary, this disclosure will provide benefits to the customer including but not limited to the following:

Real time location tracking of the trailer (moving & stationary)
Cumulative mileage status of the trailer
Free Standing i.e. not required to be connected to tractor
Trailer arrival and departure notification
Trailer tire status (pressure & failure notification)
Trailer door position
Rearview Mirror/Monitor for driver to see behind trailer
Automatic cleaning of all vision devices (direct & indirect) and sensors
Wireless sensor network on trailer
Cargo Status (visual & informational)
Blockchain verification
Trailer Brake system status
Notification of non-operating lamps and devices on trailer
Ability to update remotely (over-the-air)
Backup lighting on the trailer
Automatic pairing of devices in trailer with tractor devices In other exemplary embodiments, the present disclosure strategically locates a plurality of sensory communication devices ("SCDs") on the vehicle. The sensory communication devices may comprise one or more wireless CCTV video cameras, IP cameras, microphones, and other such devices (wireless or hardwired) adapted for capturing audio, video, and imagery data in and around the vehicle. Other sensory communication devices may comprise reflective mirrors, electronic (LCD) displays and electronic screens, and devices for washing, heating and/or drying such mirrors, displays and screens. The sensory communication devices may be web-enabled, and may comprise transceivers and flash memory for software upgrades, troubleshooting, and the like. Each of the sensory communication devices is operatively paired with the vehicle data bus (e.g., power line carrier or "PLC"), the mobile computing device discussed above, and one or more vehicle sensors including, for example, ABS braking sensors, vehicle turn signal sensors, headlight sensors, windshield wiper sensors, safety air bag sensors, transmission gear sensors, speedometer sensor, odometer sensor, clock sensor, steering wheel position sensor, sensors indicating position of tractor in relation to trailer, engine and ambient temperature sensors, distance and motion sensors, battery sensors, tire sensors, and others. The vehicle sensors may comprise or utilize transceivers, transmitters or other means for communicating their state or condition directly to respective paired sensory communication devices, or to a central onboard wireless access point (WAP) in the cab of the vehicle. The onboard access point cooperates with an onboard router and transceiver (or modem) to connect the sensory communication devices and vehicle sensors to a local area user network. The modem may include bridge and/or repeater modes. The connected devices and/or sensors may be hardwired to the onboard access point via existing vehicle data bus (using technology described in prior U.S. Pat. No. 7,817,019), or may connect wirelessly using Wi-Fi, BLUETOOTH, Z-WAVE, or related standards. The vehicle data bus may communicate with the access point, onboard recording devices, and vehicle sub-systems such as ABS braking system, engine, transmission, and tire modules using SAE, ISO, or CAN standards (e.g., SAE J1708/1587, SAE J1939, SAE J1850, SAE J2497 [PLC], and RS232). The complete disclosure of the aforementioned prior patent is incorporated by reference herein. The onboard access point may communicate with 30 or more sensory communication devices and vehicle sensors located within a radius of more than 100 m. Alternatively, the access point may be integrated with one of the onboard sensory communication devices or onboard vehicle sensors.

BRIEF DESCRIPTION OF THE DRAWINGS

Exemplary embodiments of the present disclosure will hereinafter be described in conjunction with the following drawing Figures, wherein like numerals denote like elements, and wherein:

FIG. 1 defines a safety control box for the rear of the trailer.

FIG. 2 illustrates the location of the devices on the trailer.

FIG. 3 shows the safety control box connected to the data bus transceiver with twisted pair wiring.

FIG. 4 illustrates the sub-systems of the trailer and tractor communication paths with the safety control box, the data bus transceiver and the ELD.

FIG. 5 shows the video communication paths to the tractor and ELD and the ELD communication paths with the cloud and cellular ELP platform.

FIG. 6 illustrates the trailer and tractor sub-systems communication paths.

FIG. 8 shows the features that could be added to the rearview Mirror/Monitor.

FIG. 9 Illustrates an exemplary rearview vision system components and architecture.

FIG. 17 illustrates a number of specific locations on the rear of the trailer.

FIG. 18 shows location and power source alternatives on the side of the trailer.

FIG. 25 illustrates an alternative design of the safety control box using extrusions and attaching to the ICC Underride Bumper/Bar/Guard.

FIG. 26 shows a cross-section of an example arrangement of components within the box and how the extrusions & end pieces can be arranged for various modules.

FIG. 27 is a schematic showing the elements of the automatic device cleaning method and system.

FIG. 33 depicts a trailer reverse lighting system which activates based upon wireless communication from a tractor based module and a sample tractor trailer electrical connector.

DESCRIPTION OF EXEMPLARY EMBODIMENTS AND BEST MODE

Figure 7:
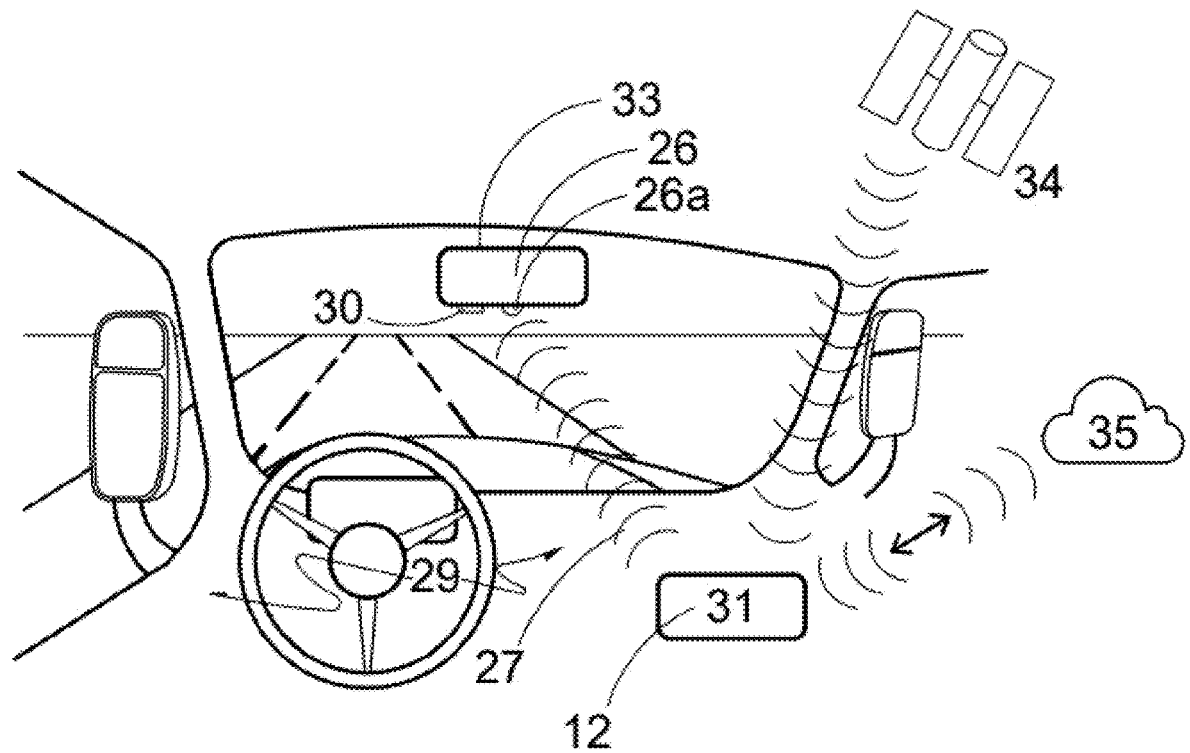
FIG. 7 shows an interior cab view of an exemplary motor vehicle, depicting use of the rearview display.

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning, not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the drawings, FIGS. 1-37.

Safety Control Box:

The modular Safety Control Box (FIG. 1) is intended for mounting on the trailer or van portion of a tractor-trailer combination unit in order to add a variety of sensing and communication capabilities. These system components could similarly be incorporated into the initial design of new trailers to fulfill the same functions. Embodiments of the safety control box could function in concert with or independent of existing telematics and electronic logging device systems.

The first sensor featured in FIG. 1 is a Doppler radar module mounted at a 45-degree angle with respect to the road surface. In this configuration, Doppler shift can be leveraged to determine the vehicle velocity.

A second Doppler radar mounted to face upward through the radar permeable flooring materials (wood, etc.) commonly used in trailer manufacturing, could be used for security monitoring. This module gives the system the ability to detect motion over the trailer door opening. If unexpected motion is detected, an alert can be sent to the equipment or cargo owners. This could even alert authorities directly based upon the danger or value of the assets contained in the trailer.

The third sensor in the FIG. 1 provides ranging information to assist in backing maneuvers as well as providing indication of impending rear end collisions. The functionality required of this sensor could be achieved using a number of different sensor types such as radar, lidar, and ultrasonic. Assisting the driver in docking and other backing maneuvers adds value as this is an activity that must be performed very frequently, especially in pick-up and delivery applications. In FIGS. 2 and 3, this distance ranging information is displayed to the driver by use of an indicator lamp positioned (item 14) at the front of the trailer, viewable by the driver as part of the view available to them in their normal mirror alignment. This simplifies communication with the driver by eliminating the need for wireless electronic transmission of this information between the trailer and tractor. FIG. 2 depicts wireless data transmission between the back-up sensors and the forward indicator lamp (14), whereas FIG. 3 depicts a wired connection between the safety control box (A) and the forward indicator lamp (14). Items 4 and 5 in FIG. 1 refer to the left and rightward facing sensors responsible for detection of vehicles or obstacles entering into the trailer side zone. Lane change/merge maneuvers, especially on the right hand side of the vehicle, pose a serious danger to occupants of both vehicles as the truck driver visibility of this trailer side zone is seriously impaired by blind spots. By assisting the driver in monitoring when a vehicle enters into this danger zone, these lane change/merge maneuvers can be significantly improved. Streaming video data from a camera sensor in the safety control box (A) could also be passed to the in-cab display in a manner similar to that of the other sensors described in FIG. 1.

Items 6 in FIG. 1 refer to a set of centrally mounted LED warning lamps. This array of lamps could be useful in avoiding rear end collisions that have been on the rise due to distracted driving and a bevy of other conditions. An example of this use would be as an equipped tractor trailer is travelling down the roadway and approaches a traffic slowdown ahead. As they are forced to decelerate, a distracted driver to their rear may be unaware and begin approaching the trailer bumper at a rate above a certain threshold. A combination of sensors (3, 4, & 5) detects the incoming vehicle and flashes these LEDs in an attempt to alert the approaching driver to the impending collision so that they may take proper avoidance steps. Similarly, if an equipped tractor trailer is stationary off the side of the road, the system could warn approaching drivers that drift out of their lane onto a collision course with the rear of the trailer. These LEDs could be supplemented with an audible horn system, wireless communication to the approaching vehicle, or other means of alerting the driver of the impending collision.

An accelerometer could be used as part of this system to determine when traffic events such as sudden decelerations or accelerations occur. This would allow the system to tag and store a buffered section of data including vehicle speed, acceleration, time, location, etc. preceding the event for later forensic investigation or driver coaching applications. The relevant data can also be wirelessly transmitted to the telematics system or directly to the cloud for viewing in the back-office. Along with the buffered event data, information such as the GPS location, tractor ID number, trailer ID number, and driver ID could be submitted. In the case that a cargo-load of hazardous material was being transported during the recorded event, a high-priority message can be immediately sent to the appropriate parties. The rearward facing camera or cameras (item 7) will supplement the safety control box (A) with visual information to be transmitted.

A wireless transceiver (Bluetooth/WiFi/etc.) (Item 11 in FIGS. 2 & 3) positioned sufficiently close to the driver cab for reliable connection and communication during vehicle operation is used to transmit operation data to a smart device such as an ELD display mounted in the cab. Relevant alerts and data gathered by the system can be passed onto the driver through this interface. The pairing of the system to the in-cab display could be streamlined by using a QR code or NFC tag mounted at the front of the trailer, programmed with the relevant system connection information. When scanned by the portable in-cab display, a connection would automatically be created between the in-cab display and the system, ensuring that the proper connection has been made between the linked tractor and trailer. The mounting of this transceiver could be potentially incorporated into the design of the SAE J560 or J1067 nose box.

Items 13 of FIG. 2 are amber LED warning indicators visible to drivers of other vehicles. An accelerometer (8) can be used to activate these LEDs when a deceleration greater than 4.5 m/s$^2$ is detected. This serves to warn drivers to the rear of the vehicle that an unusually large braking event is ongoing. These warning lights could also be triggered at vehicle speeds below a certain threshold such as ten miles per hour. This could help prevent rear-end collisions occurring where light traffic comes to a sudden stop (fog, lane blockage, etc.) and highspeed traffic approaches from the rear to find unexpected stopped vehicles.

Items 15 & 17 of FIGS. 2 and 3 are forward indicator lamps for blind spot alert. They are visible to the driver as part of the view available to them in their normal mirror alignment. When the system detects a vehicle entering into the left or right blind spot, the corresponding indicator lamp will be lit to inform the driver of the detected vehicle. Alternatively, this information could be displayed on the in-cab display (ELD or otherwise) via a wireless connection such as Bluetooth or WiFi from an antenna located at the front of the trailer. The indicator lamps (items 14 & 15 in FIGS. 2 & 3) must protrude outboard of the typical aerodynamic side fairing to be visible by the driver via the tractor mirrors. These lamps must, therefore, be aerodynamically designed to minimize disruption of the laminar flow along the side of the tractor trailer unit.

The use of Electronic Logging Devices (ELDs) is currently mandated by the FMCSA and regulation is under development under Canadian law as well. Under the ongoing mandate, all but a small fraction of exempt truck drivers must now log their Records of Duty Status (RODS) electronically. This is handled automatically by ELD equipment connected to the vehicle data bus and to cloud servers. The proliferation of these devices across the industry sets a baseline for the type of technology that will be found on modern tractor trailers and even vehicles from the 2000s era onwards. ELD systems rely on an in-cab display in order to show drivers Hours of Service (HOS) information. This ELD display (item 12 in FIGS. 2 through 8) can also be leveraged to display other information to drivers such as blind spot alerts, streamed rear-view video, and status indications from various sensors around the vehicle. The ELD can also serve as a link to the vehicle diagnostics from the engine computer. Access to this information allows for vehicle health prognostics to be run, which can help reduce cost-of-ownership through streamlining the maintenance process and predicting failures before they occur. Information such as fault codes, speed, seat-belt state, odometer reading/mileage, cruise control state, engine RPM, braking input, steering input, accelerator pedal actuation, and more can be recorded and analyzed as part of accident investigations or driver coaching.

Automatic Pairing Between Tractor and Trailer(s)

The following outlines a method for the pairing of wireless systems mounted on separate pieces of a tractor trailer combination. One of the greatest challenges to overcome in wireless communication between tractor trailer combinations is establishing the correct connection when a trailer is dropped off and a new trailer is picked up. One proposed method of ensuring the correct two vehicles (tractor and trailer) are wirelessly paired during pickup is outlined here. First, a tractor backs to the intended trailer and links the two vehicles as normal (mechanically/electrically/pneumatically). When the electrical connection from the tractor to the trailer is established, the data bus transceiver (item 11 in FIGS. 2 through 7) and safety control box become powered. The tractor's ELD (item 12 in FIGS. 2 through 9)) can access vehicle speed through either connection to the engine data bus or calculate it through change in GPS location. Similarly, the data bus transceiver (Item 11) in combination with the safety control box (A) can access the trailer speed through the ground speed radar (item 1 in FIG. 1) or calculate it through change in GPS location. After being powered on by electrical connection to the tractor and once a sustained non-zero velocity is detected by the data bus transceiver (11) or safety control box (A), a segment of the velocity data is transmitted as part of the pairing signal. This segment of velocity data must sufficiently match with the velocity data being captured by the tractor's ELD system (12) before a connection is initiated between the two systems. An increase to the sample time for the velocity segment would further increase the certainty that the two vehicles are in fact operating as a single tractor trailer assembly. Alternatively, the pairing could be initiated in the same manner by the tractor mounted ELD (12) when a sustained non-zero velocity is sensed. These pairing methods could extend to accommodate vehicle combinations with multiple attached trailers (double, triples, etc.). The velocity profiles associated with each of the individual vehicles remain relatively aligned and simultaneous connection between the set of vehicles can be initiated.

An alternate method of pairing electronic devices is by inserting the logic to recognize the exact same braking pulse (pressure and duration) the trailer device and tractor device experience. This occurrence would trigger the automatic pairing of the devices.

FIG. 4 shows the safety control box (A) has the capability to wirelessly communicate with remote sensor modules (19) over a standard such as Bluetooth, WiFi, Zigbee, or Z-Wave or a wired connection (LIN, CAN, RS 485, etc.). These remote sensor modules (19) could provide information regarding the tire pressures/temperatures, tire inflation system status, trailer refrigeration unit, internal trailer temperature, brake stroke, wheel bearing temperatures, lift gate battery state of charge, cargo status, trailer lighting diagnostics, and axle weight/loading, among other information. This additional information can be relayed to the in-cab display, telematics system, or directly to the cloud (FIG. 5). For example, the tire inflation system can be connected to additional input/output (I/O) pins of the safety control box (A) or the data bus transceiver (11) and monitored to determine if a persistent leak is present. A remote sensor (19) tied into the tire inflation system's status light detects the system activation. If the system is active at an abnormal frequency or for too long, this could indicate a leak that needs to be addressed. These abnormalities can be communicated to the safety control box (A), then ultimately to the back office. In a like manner, other trailer electronic systems such as the antilock braking system (ABS), electronic braking system (EBS), Electronic Stability Control (ESC), and weighing system (i.e. Air-Weigh) could communicate their statuses or warnings (i.e. FMVSS 121 ABS status indication) to the trailer's safety control box (A) allowing for further transmission to the cloud or telematics system.

A data bus transceiver (11) positioned at the front of the trailer relays communication between the safety control box (A) and the in-cab display or ELD system (12). Communication between the safety control box (A) and the data bus transceiver (11) are carried out over twisted pair wires and may follow a communication standard such as SAE J1708, SAE J1939, SAE J2497 (Power Line Carrier), RS 485, RS232, USB, SPI, or CAN. Alternatively, LIN bus technology could be used over a single wire to reduce the cost and complexity/cost of the system in applications where no safety critical, low latency, or high data rate requirements are present. The data bus transceiver (11) can be housed as part of the SAE J560/J1067 trailer nose electrical box.

In FIG. 4, the in-cab display or ELD system has the capability to communicate with remote sensor modules (18) over a standard such as Bluetooth, WiFi, Zigbee, Z-Wave, etc. These remote sensor modules (18) could provide information regarding the tire pressures/temperatures, brake stroke, wheel bearing temperatures, tractor lighting diagnostics, axle weight/loading, and driver/passenger biometrics, among other information. This information could be displayed to the driver, transmitted to the cloud for remote viewing, or be used as a trigger to initiate automatic responses in the system.

The safety control box (A) could also be used to house electronics adding functionalities such as automatic door locking, load imbalance detection, trailer cargo capacity percentage, and accessory system status monitoring. For vehicles making frequent stops for pickup and delivery, cargo doors are often left unlocked. In city gridlock traffic, these vehicles (especially beverage trucks) are targeted by thieves who unload and steal goods from immobilized vehicles. Through either communication with the vehicle data bus to obtain vehicle speed or by monitoring the change in GPS location data, doors could be automatically locked when the vehicle begins moving. Additionally, cargo monitoring can be carried out by an interior camera sensor. Through software analysis of the images captured, the contents and the remaining capacity of the space can be analyzed. This system could also provide cargo security footage and trigger an alert to the back office in the case of theft or unauthorized access including GPS data from the system.

The use of smart contracts utilizing Blockchain technology (25) to verify the completion of certain conditions before releasing payment for the contracted service creates a need for an automated system capable of reporting the status and location of goods to be delivered. The safety control box could identify and monitor tagged cargo contained within the trailer or shipping container. With access to location data through the safety control box's GPS antenna and cargo loading/unloading/condition information, the conditions of the smart contract can be verified the contract can be successfully fulfilled. Elements such as GPS position, delivery time, cargo temperature, cargo humidity, cargo accelerations experienced, and cargo orientation data can be considered when evaluating the fulfillment of shipping contract terms. This enables the confident use of "payment upon delivery" for both parties without the involvement of an impartial third party. The use of the Blockchain technology will make this transaction secure of possible discrepancies.

When a vehicle is improperly loaded such that a severe imbalance is created across the longitudinal axis of the vehicle, there is an increased risk of drivetrain damage and more importantly an increased safety risk of vehicle rollover. These risks can be avoided by properly balancing cargo during loading and unloading, but sensor units with load cells to monitor local loading conditions across the vehicle could be used monitor and alert users to hazardous conditions. This loading information could also be key for vehicle manufacturers in denying warranty claims due to faulty loading practices and not to any manufacturing defect.

Some vehicles have additional accessories such as ladders or hand trucks which must be properly secured to the exterior of the vehicle between stops. If these accessories become loose during transit, they pose a grave risk to other drivers on the roadway that they may collide with if lost. The latches used to secure such accessories could be monitored electronically to ensure proper securement. When unsecured, a signal could be sent from the monitoring sensor to the safety control box. This signal could trigger an alert to the user to make them aware of the situation, or alternately communicate over the vehicle data bus in order to prevent the vehicle from driving away.

Trailer Reverse Lighting and Camera/Sensor Activation

Due to the ingrained limitations of trailer electronic communications with the tractor (over SAE J560 7 pin connection) reverse triggered lighting is not a feature offered on the trailer. This functionality could be added to trailers by using a Doppler radar module mounted on the trailer and facing the ground at a 45 degree angle. By detecting the relative movement of irregularities in the road surface passing underneath, the vehicle direction of travel can be determined. This can be accomplished by using a radar sensor with outputs of both Intermediate Frequency (IF) signals and In-phase/Quadrature (I/Q) signals. The I/Q signal, when referenced to the IF signal, can be used to distinguish between a target moving towards or away from the module. Using this analysis, even though the vehicle transmission state is not known, once the vehicle begins to move backwards appropriate actions can be taken. For example, reverse lighting to help illuminate the area for easier viewing can be triggered or a backing alarm warning can be triggered to alert those nearby of the vehicle's change in direction. Additionally, the sensed direction of motion can be used to trigger a change in the video camera view provided to the driver.

An alternate method of adding backup lights on the trailer is to "pair" the trailer backup lights to the tractor backup lights via Bluetooth technology. With this disclosure, the tractor backup lamps would be designed with a transceiver that would transmit signal when activated. This will allow the trailer to have backup lighting that is activated by the tractor backup lamps.

Electronic communication between the safety control box and various remote sensors could be carried out through either wired or wireless means. For sensor locations where wireless communication is desirable, the Bluetooth Low Energy standard can provide impressive range and low power requirements. Where a higher wireless data throughput is needed, WiFi or a similar communication method could be employed. For sensor locations where wired communication between the safety control box and the module is desirable RS 485 or SAE J1708 communication over a twisted pair wire is well adapted for the application. RS 485 allows for reliable signal passage on runs up to 1200 meters long, can accommodate 256 nodes on a single bus, and supports communication rates up to 50 Mbps. In addition to this, it is possible to carry out both communications and power supply simultaneously over an RS 485 interface. The coexistence of the low-current, high-frequency communication alongside the higher-current, low-frequency DC power supply reduces the amount of wiring needed to connect the safety control box and remote sensor modules, while eliminating the need to find a separate power source at the remote location. Additionally, the increased current now present on the RS 485 line will decrease the likelihood of tin fretting corrosion experience in the associated connection points.

Making use of this RS 485 dual communication and power supply capability, a whole network of sensors on the trailer could be established. This could be accomplished by adding a twisted pair wire to the standard 7 conductor SAE J1067 cable. A connection to the auxiliary power supply (pin 7 of SAE J560 connector) could provide power to the distributed sensor modules, while also allowing for the data to be collected at the safety control box at the front of the trailer where it could be wirelessly passed to the ELD/telematics system housed in the tractor or even directly to the tractor ECU. A standardization of such a communication network could allow for better communication and control of trailer systems from the tractor. As an alternative, the LIN bus also has the potential to offer this type of functionality.

Video streams from various locations around the trailer could be valuable for both vehicle operation and for driver training or accident investigation purposes. Video streaming data is sent from the trailer-side video wireless transmitter (21*a*) to the in-cab wireless receiver (21*b*) to be viewed on the vehicle's ELD display (12). The inputs to the video wireless transmitter (21*a*) are hardwired (20) from the individual camera modules positioned around the trailer.

This video data can be uploaded to the cloud (23) for review by the back office (24). A cellular or wireless data communication method from the ELD or telematics system (22) serves to transmit this video data to remote cloud servers.

Video Mirror Display and Warning System:

FIG. 7 shows an interior cab view of the motor vehicle. The use of a display instead of a traditional mirror increases flexibility in available mounting positions, since placement is no longer based upon a mirror's required vantage point. The traditional rearview mirror mounting position is still viable with the rearview display system described, especially when used with a combination mirror/display unit in a cab with a rear window. In a rear-windowed cab, this mounting position allows for use of both mirror and image/video display capabilities. Either an adhesive mounting solution, like the ones found in most passenger car rearview mirrors, or a bracket/hardware based mounting solution could be used to install in the windshield area. The use of high strength, but quick release adhesives, such as 3M's Command Strip series or a similar adhesive, to mount the display unit to the windshield would give the truck owner flexibility to reposition the display should they desire. The bracket and hardware approach could be attached to the cabin head-compartments commonly found in heavy trucks. For either of the aforementioned windshield region mounting methods, the wiring could be routed next to the perimeter of the windshield or up into the head-compartment such that it does not interfere with driver vision. The display could also be mounted on the dash or driver side A-pillar. An A-pillar mounted display would require a minimal amount of head and eye movement from the driver to monitor all relevant areas of the road. The interior A-pillar is visually close to both the hood mounted and side mounted mirrors commonly found on heavy trucks. Grouping all these road monitoring devices together could help increase the efficiency of the driver's hazard assessment. The display could also be mounted near the exterior side-view mirror of the vehicle, a location the driver already has to frequently monitor. All of these mounting positions could be achieved on a retrofit basis, but could be further improved by incorporation into the original equipment manufacturers cab design.

From a Human Factors perspective, the location of a display is an additional place for the driver to look while performing his multiple driving tasks and must require minimum eye movement. Currently drivers are trained to watch the roadway ahead, check both side mirrors and glance at the critical instrumentation on the instrument panel (the Smith Method). Providing additional information to the driver using a monitor (either a separate device or integrated into the instrument panel) is acceptable if located as high as possible to minimize eye movement but the location of a windshield mounted mirror/display is superior. The placement on the windshield requires only slight eye movement from the road ahead and is familiar to every driver. All truck drivers have driven passenger cars or light trucks with windshield mounted mirrors.

An alternative method of presentation to the driver would be a Heads-Up Display (HUD) system. Video stream, warning indication, and other information could be conveyed without overly impeding the driver's view of the road ahead. An example of such a system is the Navdy HUD device. It also allows for gesture control input from the user to activate different features.

The transferal of data from the camera in the rear of the trailer up to the display unit in the truck cab is a critical link in the system. This communication is achieved through wireless transmission between the vehicle with the display and the vehicle with a camera or other sensors. The transceiver for the segment of the system found in the tractor could be mounted in a variety of positions around the tractor. The transceiver for the segment of the system found in the trailer could be mounted in a variety of positions around the trailer. For example, the tractor-side transceiver could be mounted on the exterior rear side of the cab and the trailer side transceiver could be opposite it on the front of the trailer. This arrangement would provide a short gap for communication to take place, decreasing the chance for signal deterioration or other problems that can be exacerbated in longer range wireless transmissions. The required data transfer could be carried out with a variety of wireless communication methods such as Wifi, Bluetooth, infrared, laser, proprietary signal, etc. Unwanted communication between tractors and trailers can be avoided through the use of line-of-sight, short range, or directional wireless transmission methods that could successfully carry out communication between connected tractor and trailer units, but prevent unwanted connections between tractors and trailers that are not connected. A combination of these methods could also be used for additional security. The line-of-sight, short range, or directional wireless transmission type could be used to initiate tractor and trailer communication, while the more bandwidth intensive video and other communication could pass over a higher throughput wireless transmission method. Connection could be recertified periodically using the line-of-sight, short range, or directional transmission type. This "heart-beat" signal would ensure that no change had been made in the tractor trailer combination.

Another way to ensure that the tractor communicates with only the proper trailer is to pair the two vehicles using Near Field Communication (NFC) and Quick Response Code (QRS). For example, an NFC and Bluetooth enabled smart device could be used to scan an NFC tag on the trailer. When scanned, this NFC tag would transmit to the smart device the relevant connection data and means of authorizing communication between the tractor segment and trailer segment of the rearview vision system. The smart device could then transmit this connection information via Bluetooth, WiFi, NFC, QRC, or other data communication to the tractor segment of the rearview vision system. With this information, the tractor segment of the system could initiate connection to the scanned trailer only.

The trailer segment of the system would draw power from the trailer. As long as the trailer is connected to a tractor, auxiliary power is made available to the trailer systems through the auxiliary pin (7/blue) of the standard Society of Automotive Engineers (SAE) J560 connector. The trailer-side rearview vision system could tap into this power from a marker light, charge a battery from the intermittent stop lamp circuit, or otherwise tie into the trailer's electrical supply. If the camera or other sensors of the system are mounted separately from the transceiver, then the wiring between these system components could follow the same route as current trailer wiring to provide adequate mounting. To transfer video data from the camera to the transceiver, a high-fidelity video cable would be used to prevent degradation of the signal as it is transmitted.

A variety of sensors such as cameras, radar, LIDAR, sonic, temperature, voltage, as well as others could be located in different areas around the trailer. A camera, or cameras, at the rear of the trailer would provide a video feed processed to simulate a rearward view of the road typical to a passenger car rearview mirror. The camera or camera array would have a field of view near 180 degrees such that the driver could see to either side of the vehicle to detect if the end of the trailer has fully passed an obstacle or to know when a vehicle is entering the side region of the trailer. The camera array could have infrared or night mode capture for driving in low light environments. The camera array could be mounted in a variety of ways, including off of the trailer's bumper or in a self-contained marker light assembly that functions as a marker light and provides easy access power and mounting. Cameras feeding into the system could also be located in areas such as the fifth wheel and king-pin to help judge alignment during trailer hookup.

FIG. 8 shows an exemplary design of features that can be added to the Mirror/Monitor display system.

This disclosure includes an enhanced vision video display system and method for transportation vehicles. The typical tractor trailer (class 8 truck), even if it has a rear window on the cab, does not have an interior rearview mirror. This is because the view out of the rear of the cab is occluded by the attached trailer. This is also true of class 3 through 7 commercial vehicles, such as straight-trucks, whose permanently affixed cargo areas similarly occlude the view. The same rearview mirror functionality found in passenger cars can also be achieved in the commercial vehicle space through the use of a multi-part system to synthesize and deliver pertinent information to the user in an intuitive, central location. The technology to achieve this is a video display configured like the common passenger car rearview mirror, using video from the cameras on the rear of the vehicle or trailer(s). The unique NFC or QR code pairing method with Bluetooth RF technology allows easy pairing between the cameras and display.

Referring to FIG. 9, item 26 depicts a display unit located in the cab of a truck. The rearview video display, along with LED indicator, communicate the presence of surrounding obstacles to the driver. In truck cabs that have a rear-facing window, there are some situations, such as during trailer hookup and independent operation of the truck without a trailer, where a traditional rearview mirror could provide valuable assistance to the driver. If the display is mounted in a conducive location, it could be toggled from mirror to display mode through the use of a dual-mode mirror/display technology, allowing for its use as either a traditional rearview mirror or video display in different circumstances.

A large number of other components could be incorporated into the rearview vision system, or on the display unit itself, to provide added functionality to the user. For instance, a photosensor could be utilized to dynamically optimize the brightness of the display to maximize user comfort. By measuring the ambient light of the cab environment, the brightness of the display can be decreased in low-light situations and increased during times of greater ambient light. Additionally, the system software could process the incoming video and reduce the effect of overbearing light sources such as glare from the sun or headlight beams at night.

Outward facing notification LEDs could be added on the display and/or elsewhere on the system to serve as indicators to the user. Information that could be conveyed includes missed calls, text messages, dispatch messages, traffic conditions, weather conditions, Hours of Service (HOS) violations, and other information. An incorporated speaker or buzzer could also serve to similarly prompt users. This speaker could also fulfill other roles such as vehicle and road noise mitigation, hands free calling, etc.

If the display/mirror unit is mounted on the windshield, as the typical passenger car rearview mirror is, then an additional headlamp could be mounted facing the road through the windshield. This lamp could serve to light the area immediately in front of the truck either as a driving or work light. This would be particularly useful when the truck's hood is raised for inspection, or repairs in low light situations, as it would easily down-light the engine block area. This front-facing light could also be used as an external indicator to law enforcement of Hours of Service violations. With the rearview vision system tied into or acting as the driver's electronic driver logs, the system would have the driving data available to tell if the driver was driving out of service. The forward-facing lamp would then indicate to patrolling officers that the truck should not be operating. The rearview display could also be used to incorporate interior cab lighting, such as mood lighting.

The system could connect to the vehicle data bus by direct interface with the SAE J1939/1708 bus or indirectly through a wireless adapter accessing the vehicle data bus, such as the Bluetooth VNA-BT. This would provide bi-directional communication to the vehicle and would allow data such as the speed, current gear, engine RPM, etc. to be received by the system. With this connection, the rearview vision system could also be added as a node to help with inspection and diagnostics. Data from system sensors located throughout the vehicle could be processed and interpreted by the rearview vision system, and commands for actions such as vehicle braking could be issued over the same connection to the vehicle data bus. By using the SAE data bus, the rearview vision system firmware can be downloaded and updated via the vehicle's telematics system.

The system's windshield mounted display unit could also serve as a universal pass for tolling systems. Based on the GPS location data, the system could determine the appropriate state or locality's toll system, and give the user clearance to make use of toll-ways wherever they go. This would eliminate the hassle of installing multiple passes from different areas.

An infrared sensor could be incorporated into the windshield mounted display unit or mounted separately (i.e. externally with the side mirror/cameras) to monitor road temperature. This type of sensor, such as the RoadWatch Safety Sensor, can be used to inform drivers when conditions are approaching hazardous levels where black-ice might exist. With this information, the system could use its notification methods to warn not only the driver but the organization managing or monitoring the vehicle. Forward-facing and rear-facing cameras could also be incorporated to record a view of the vehicle path and cab environment. These recordings would be of use for corroboration of testimony and for driver training. Along with the video display and the system's data connection, the cab facing camera could be used for video conferencing. For example, this would allow improved communication between the driver and management or a physician in case of health problems encountered on the road. These cameras and other sensors could also be used to monitor the area in and in around the vehicle. This security function could be triggered by events such as motion or sound sensed from the environment.

A microphone could be added to the system to fulfill a variety of roles such as hands free calling, user input device, sleep/health monitoring sensor, sensing for noise cancellation, etc. As detailed elsewhere, the system will have the capability to link to the cell phone or smart device of the user, and this link could be used to conduct hands-free telephone conversations. Voice commands could also be incorporated to control aspects of the rearview vision system (display on/off, display dimming, change active video stream, etc.), cell phone/smart device system (ringer volume/vibration/silent, play/pause media, voice transcription, etc.), or vehicle system through the data bus connection (adjust climate control, infotainment, alarm clock, compass, GPS location, outside temperature, etc.). The use of voice commands could help minimize distraction while controlling the system. In a cab equipped with sleeping accommodations, the microphone could be used to collect breathing data to assist drivers suffering from sleep apnea, asthma, or other conditions in health event detection and prevention. Additionally, the microphone could detect ambient noise during travel and feed this data into a processor driving speakers to actively cancel road or other ambient noise. This could further assist drivers in getting a good night sleep by providing a quiet environment or playing calming background music or noise. The speakers used for this function could be separate, primarily dedicated to a noise cancellation role, and/or speakers that the truck is already equipped with.

The audio feed from this microphone could also be used as a part of an event recording feature-set of the system. Along with the recorded audio, the system could include forward-facing and/or rear-facing cameras to capture the road and driver conditions respectively. In-depth vehicle information such as speed, current gear, engine RPM, etc. could be collected alongside the audio and video data through the system's connection to the vehicle data bus. Road temperature could be gathered from the system's infrared sensor. Interface with the vehicle's telematics system would also be possible over the vehicle data bus. Global Positioning System (GPS) information could also be tied to this data either through connection to a GPS enabled smart device or through GPS hardware incorporated into the system itself. This GPS information could provide vehicle location, speed, and other data. Additionally, electronic driver log data could be linked with the system. This would provide Hours of Service (HOS) data as well as other information, such as dispatching/scheduling or individual driver information. Either a connected device or the system itself could serve to fulfil the required electronic on-board recorder (EOBR) or electronic logging device (ELD) functions. Along with this other collected data, an incorporated accelerometer could be used to capture a variety of different "event triggers" causing a record of the vehicle audio, video, vehicle data bus, road temperature, GPS, HOS, driver information and biometrics, as well as other data, to be saved and/or uploaded to offsite data storage in the cloud. These triggers could include such events as sudden acceleration/deceleration, speed outside acceptable range, over speed limit based on GPS location, unexpected route detours, biometric information from the system connected smart device or wearable, etc. This data could be stored in the system's own non-volatile data storage and/or that of a connected smart-device. It could also be uploaded either directly from the system's own data connection (cellular, satellite, etc.), through the vehicle telematics system, or from the connected smart device's data connection. Many of these same "event triggers" could be used to limit the function of potentially distracting or undesirable system components, such as a connected smart device when certain criteria such as vehicle speed, acceleration, etc. are outside an acceptable range. For instance, an app on the linked smart device could lock down access to texting and non-emergency phone calls while the vehicle is in motion.

A smart computing device (phone, tablet, wearable, etc.) could be connected to the rearview vision system by a method such as Bluetooth Classic, Bluetooth Low Energy, Wifi, wired Universal Serial Bus (USB), or other connection. Each smart device connected could be associated with a user so that, when it was connected, it could adjust the system setting based on that user's profile. User profiles could also be assigned by use of a badge scanner, fingerprint reader, facial recognition, or other biometric reader. Near Field Communication (NFC) tags could be used to assist in the wireless pairing process. For instance, an embedded NFC tag located in the display unit could be read by the smart device to be paired with the system. Stored on the embedded NFC tag is the relevant connection data and means of authorizing communication between the rearview vision system and the correct smart device. The smart device would then take the information read from the NFC tag and initiate a connection to the rearview vision system. This connection scheme not only simplifies the pairing process, but ensures that the correct device is connected to the correct system. This is important as many vehicles could be co-located at the same facility and cross-talk between devices in different vehicles could pose a safety concern to the users as they travel. Biometric sensing devices connected either directly to the rearview vision system or indirectly through another smart device connected to the system could make heart rate, blood oxygen saturation, electrocardiogram, blood sugar, blood pressure, blood alcohol content, respiration, sleep, and other data available to the system. These sensing devices could include smart steering wheels, seats, sleeping berths, etc. and could communicate directly with the ELD, communicating biometric data to the cloud. For example, an electrocardiogram measurement within an acceptable limit from the smart steering wheel could be required before the driver is able to start their engine, or log in to the ELD to track driving hours. This ensures that the back office will receive updated heart scans each time a trip is started. Inspection tools could also be linked to the system to offload or display inspection data such as tire pressures, tread depths, mileage, damage photos, and other vehicle condition information.

There are many methods of user input that could be viable in this system, and some examples of these methods follow. Buttons could be located on the display, dash, steering wheel, etc. This could even be achieved using wireless buttons located at the user's convenience. The rearview display could be a touchscreen device, allowing the user to perform such actions as swiping through display modes, tapping or swiping with different numbers of digits to perform actions, etc. Voice commands could also be issued to the system, either through the connected smart device or the incorporated microphone. A wearable or cab installed brainwave sensor could also be used to gather user input. This sensor could also be used to measure driver fatigue, and take action to avoid unsafe driving conditions.

Figure 10:
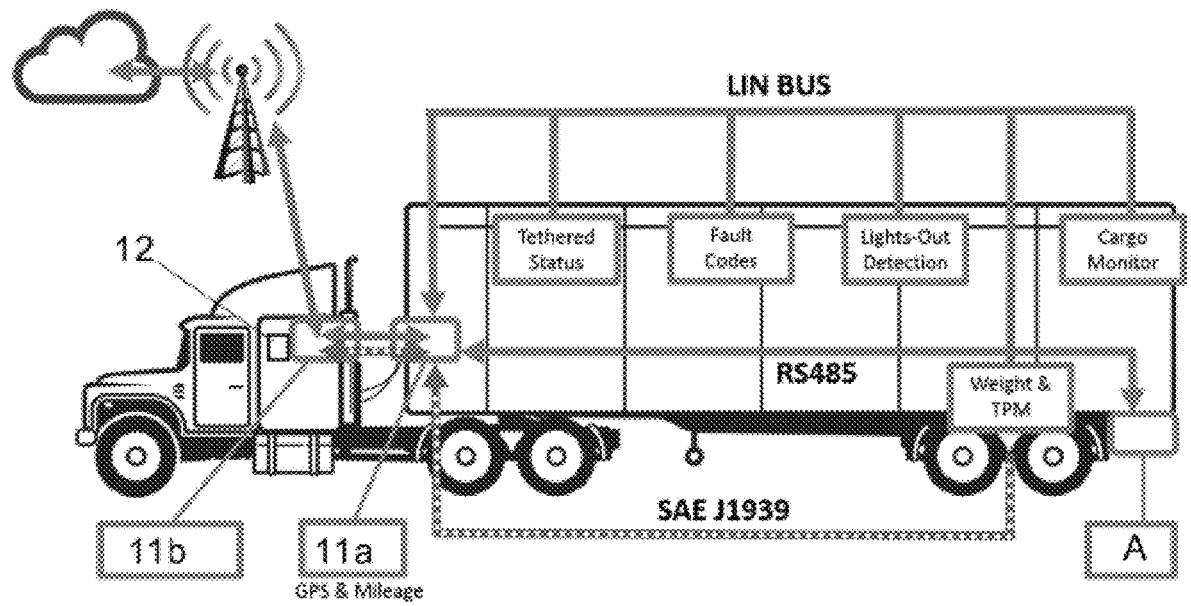
FIG. 10 illustrates the overall relationship and information flow between the safety control box, the trailer data bus and tractor data bus transceivers and the electronic logging device (ELD).

FIG. 10 displays an overview of the data & information flow from components on the trailer to the safety control box (A); to the trailer data bus transceiver (11*a*); and to the tractor data bus transceiver (11*b*) and the Electronic Logging Device (ELD).

Figure 11:
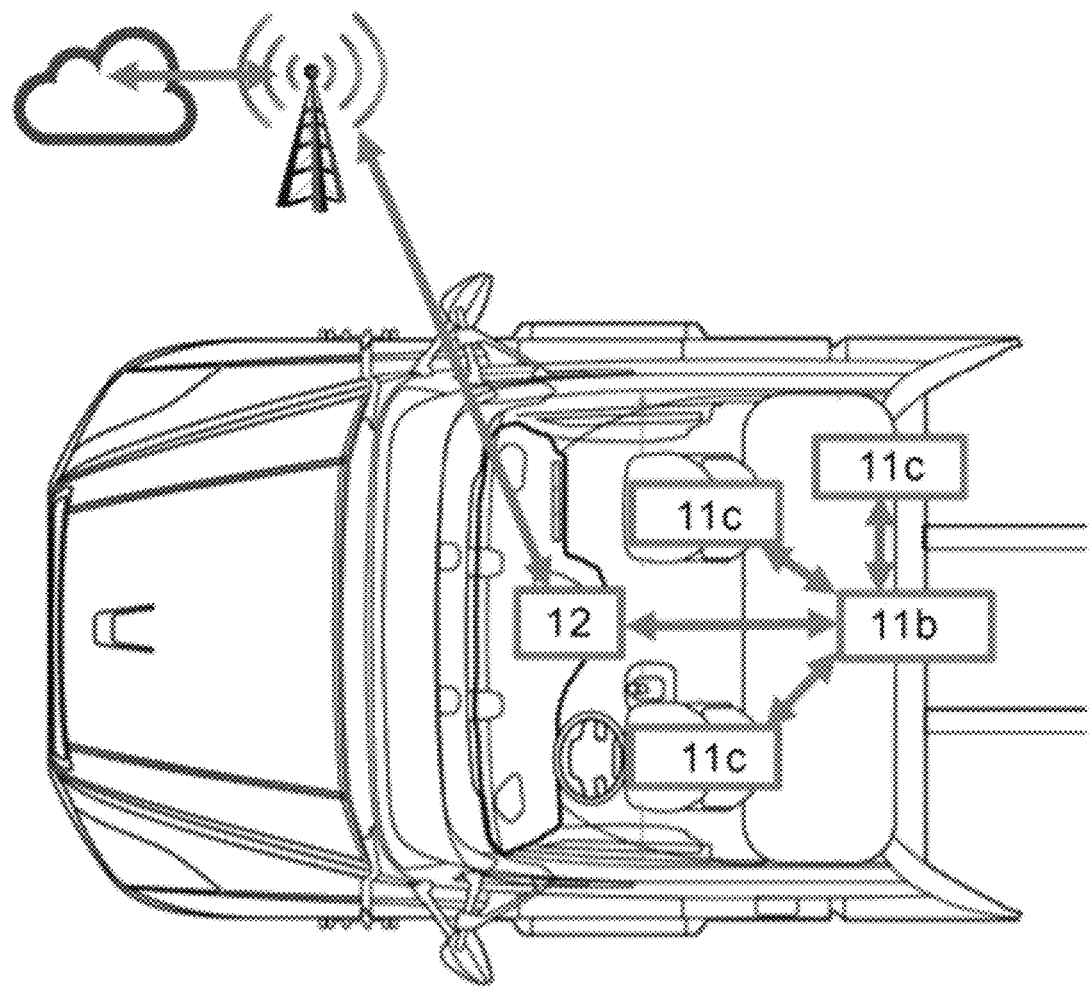
FIG. 11 shows the data and information transmission between the "smart" cab components and the electronic logging device (ELD) via the tractor data bus transceiver.

FIG. 11 show the addition of information and data from cab components (14) to the tractor data bus transceiver (11*b*) to the ELD (12) and therefore to the communications infrastructure.

Figure 12:
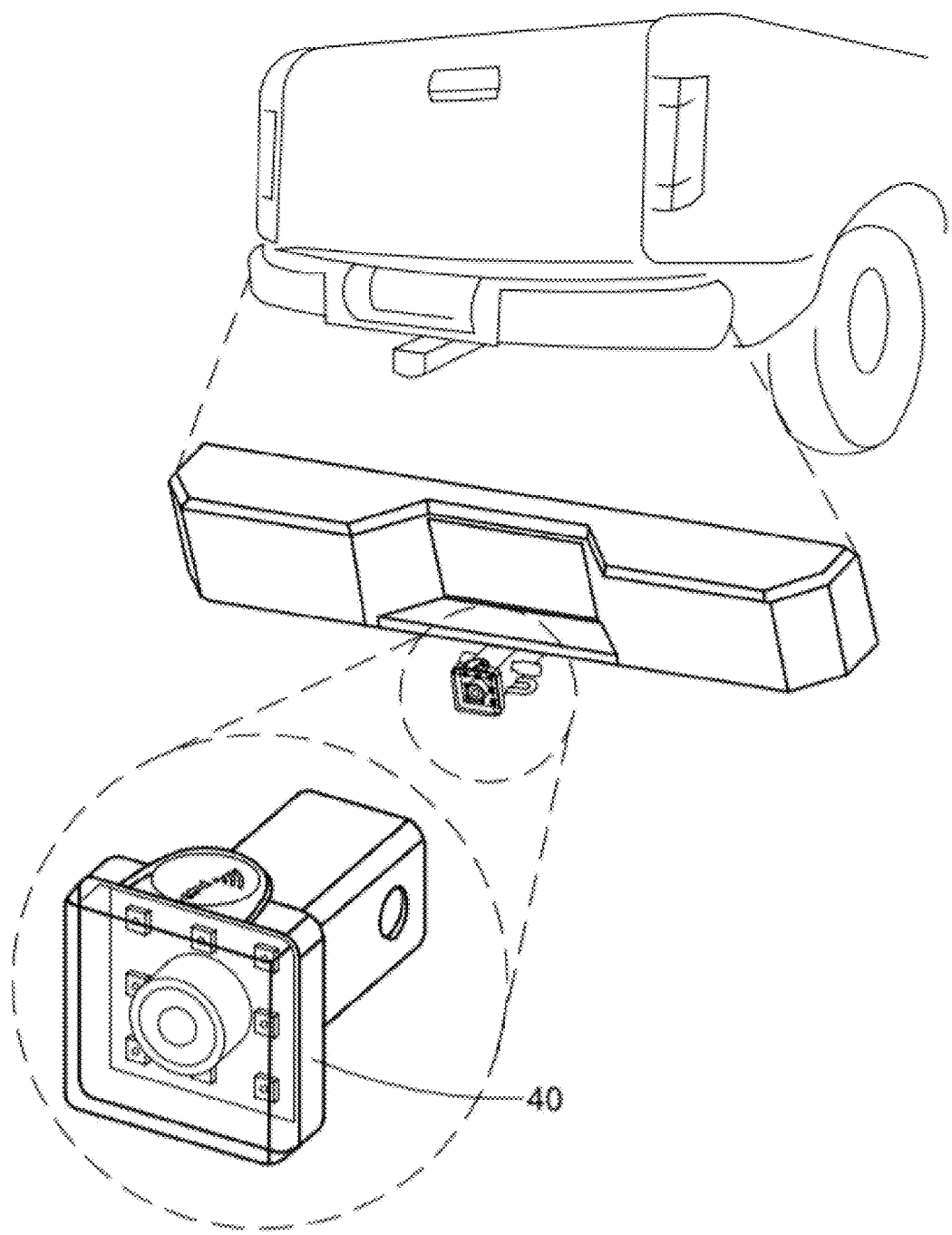
FIG. 12 illustrates an exemplary hitch mounted camera system with NFC tag or Quick Response (QR) code on a light vehicle.

FIG. 12 illustrates an exemplary hitch mounted camera system with NFC tag or QRC symbol on a typical light vehicle. The use of rearview cameras is becoming more common for passenger cars, SUVs and light trucks. For those vehicles with a commonly available tow hitch (2 and 1¼ inch trailer hitch/Reese hitch) that are still without built in rearview camera systems, a hitch mounted retrofit camera system and smart device quickly and easily add this and other functionalities. The tow hitch provides a standard and widely shared mounting point across many different vehicles. It is also a location with easy access to the vehicle electrical supply, so powering the unit from the available connector is easy for the user. In North America, some of the commonly found connectors include 4-way flat, 6-way round, and 7-way flat pinned round. Adapters between these formats are widely available and would make installation a simple matter. This rearview camera system could also incorporate LED or other lighting into the system to function as supplemental marker, brake, and turn signal lighting. By incorporating an NFC tag or QRC symbol into the hitch camera design, the WiFi, Bluetooth or other wireless pairing and connection process between the smart device and camera system can be greatly simplified for the user.

Figure 13:
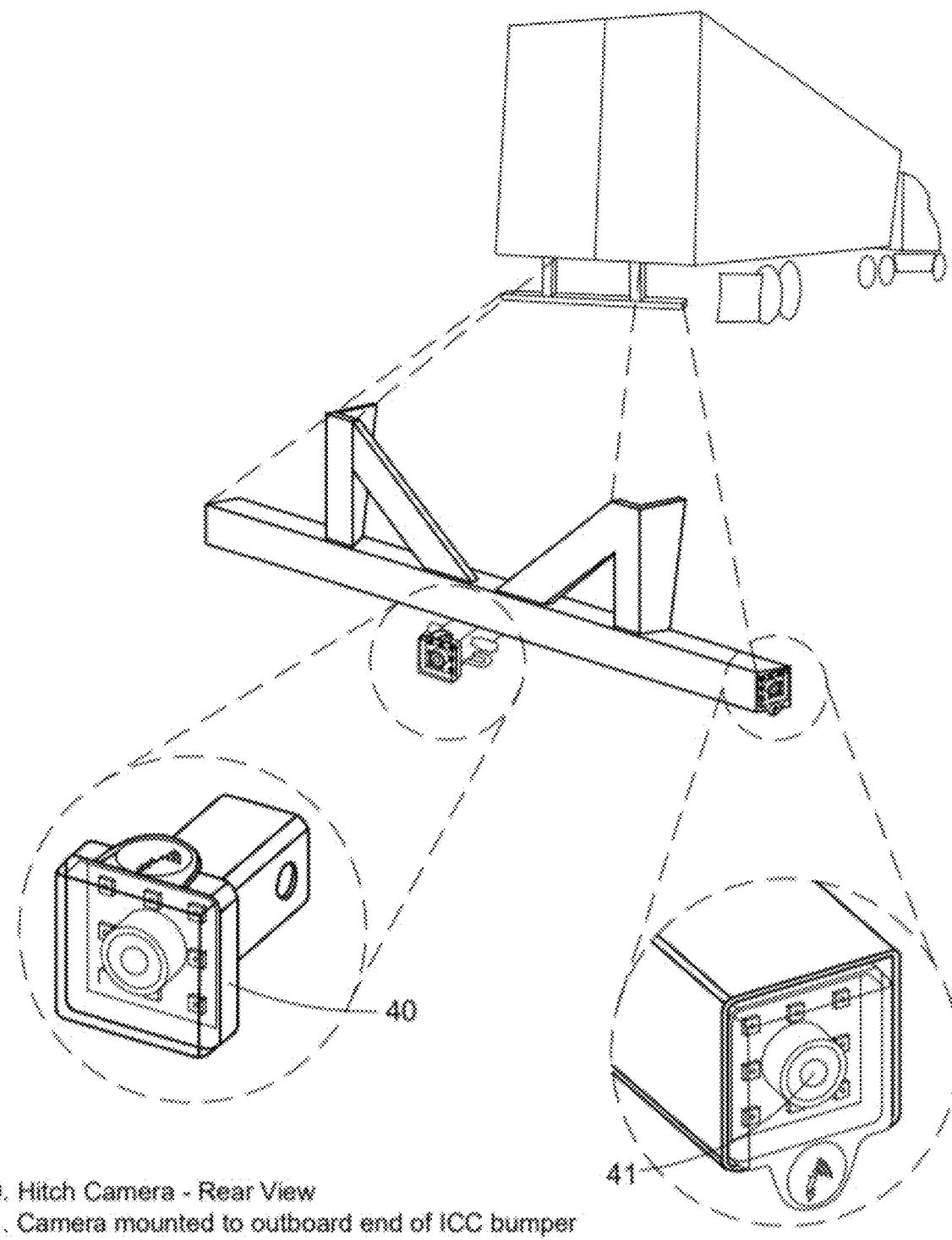
FIG. 13 illustrates an exemplary hitch mounted camera system installed on a heavy truck ICC rear bumper.

FIG. 13 shows a hitch camera on a heavy truck ICC rear underride bumper (with a welded-on hitch receiver) and a similar camera mounted in the end of the ICC bumper.

Figure 14:
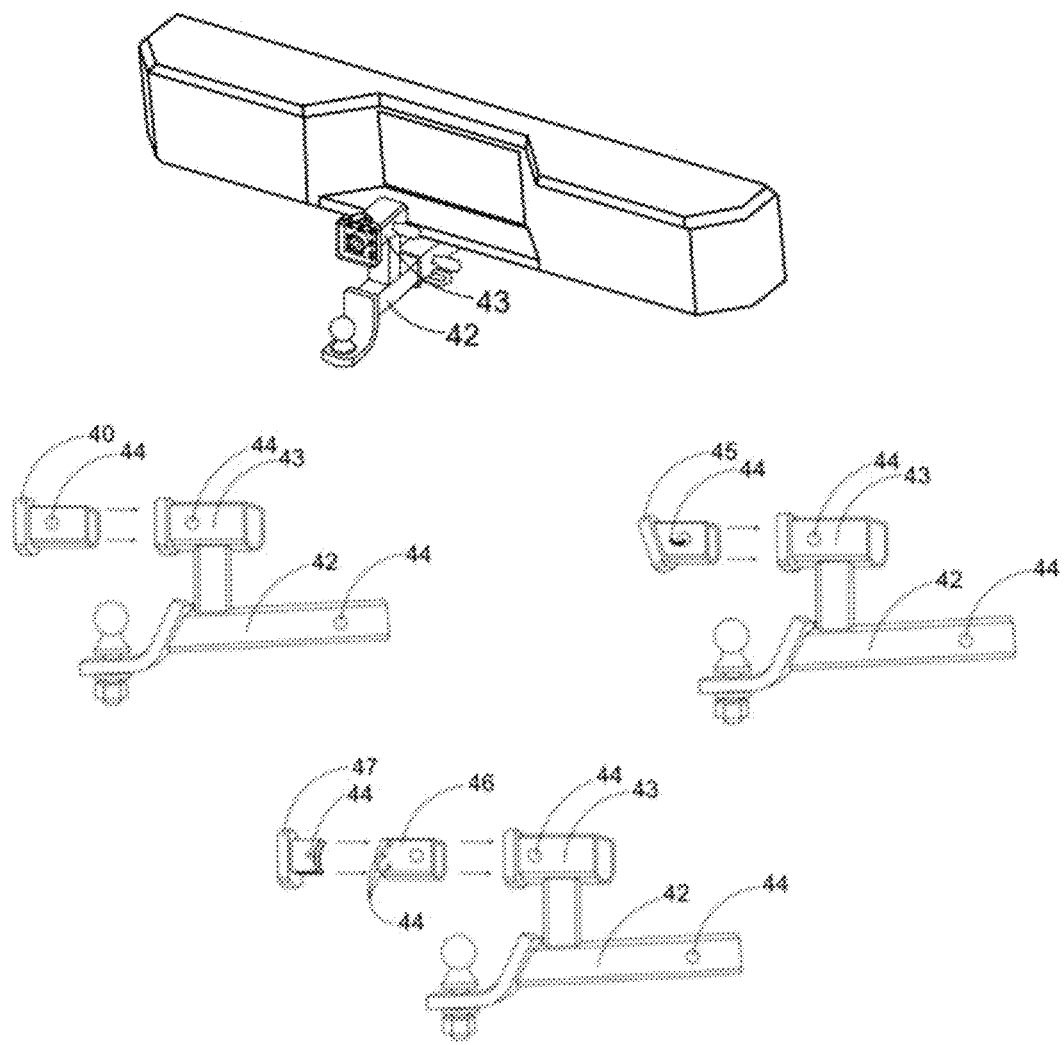
FIG. 14 illustrates an exemplary hitch mounted camera system with a supplement holder to allow view of hitch when connecting a trailer.

FIG. 14 illustrates an exemplary hitch mounted camera system, installed view. Mounting to the tow hitch is a simple process; the camera system slides into the large opening of the hitch, and a locking pin passes through aligned holes in both the hitch and camera system body. The pin is secured once it passes through, and this can help to deter theft of the unit. Connection to the vehicle power supply would vary based upon the vehicle's outfitting. The camera system could be produced to interface with any connector type and could use a wiring harness including a variety of connector types for near universal compatibility. Alternatively, a single connector type could be included to be used with the appropriate adapter to enable each installation. The body of the hitch mounted camera device could be elongated and ruggedized to act as a step to be used in mounting into the bed of a pickup truck.

Also illustrated is an exemplary hitch-mounted camera system (installed close-up view.) The described method of connection directly into the tow hitch would be impossible while attaching or hauling a trailer or other hitch mounted device. An adapter could be used to alleviate this issue. FIG. 14 shows one such adapter that would allow the simultaneous use of the hitch mounted camera and a ball mounted trailer. The camera could be angled down in this adapter such that a view would be provided of the ball hitch approaching the trailer tongue. This view would greatly assist the driver in the trailer hookup process, especially when it is conducted without another individual to assist. Also shown is an exemplary adapter allowing connection of hitch mounted camera system and trailer simultaneously.

LED or other lighting can be incorporated into the design of the camera system to provide additional marker, brake, and turn signal lighting. These LEDs could be smart addressable LEDs, capable of independently changing color for customized aesthetics or function. These lights could also provide non-visible wavelengths of lighting such as infrared for operation of the vehicle in low light scenarios. The camera could pick up these wavelengths and use them to represent the surroundings to the driver. The LED brightness could be increased for braking. For signaling a turn, the left or right half of the LEDs, corresponding to the turn direction, could change color to yellow and strobe. Settings for the light function or color could be changed through an application on the wirelessly connected smart device.

The video stream from the camera system would be processed and transmitted wirelessly to be viewed on a WiFi, Bluetooth or otherwise wirelessly connected smart device. This connection could be established manually through the system dialog of the smart device, or automatically by using the smart device to scan an NFC tag or QRC symbol containing the relevant connection data and means of authorizing communication between the smart device and the camera system. The smart device would then take the information read from the NFC tag and initiate a connection to the hitch camera system. This NFC tag could be incorporated into the design of the hitch and/or an identical tag can be mounted in the cab of the vehicle if the camera is seeing long term use in that vehicle. Scanning the tag in either location would initiate the connection to the corresponding camera system.

FIG. 13 shows the exemplary ICC bumper mounted camera, close-up view.

FIG. 14 shows an adaptor to reposition the Mounted Camera when the hitch opening is needed for pulling a trailer. The upper view shows a horizontal orientation of the camera and the lower view shows an angled orientation for the optimum view of the trailer for hitch attachment procedure.

FIG. 14 also illustrated an adjustable Camera Housing that can be positioned horizontally or at a downward angle depending on the user's preference. A slight modification in the dimensions and features of this tow hitch mounted camera would allow for its use in the hollow end of the ICC bumper commonly found on commercial trailers. The view provided would give indication to the driver of when vehicles enter and exit the region alongside the trailer, and help them determine when it is safe to make a lane change/merge maneuver.

Figure 15:
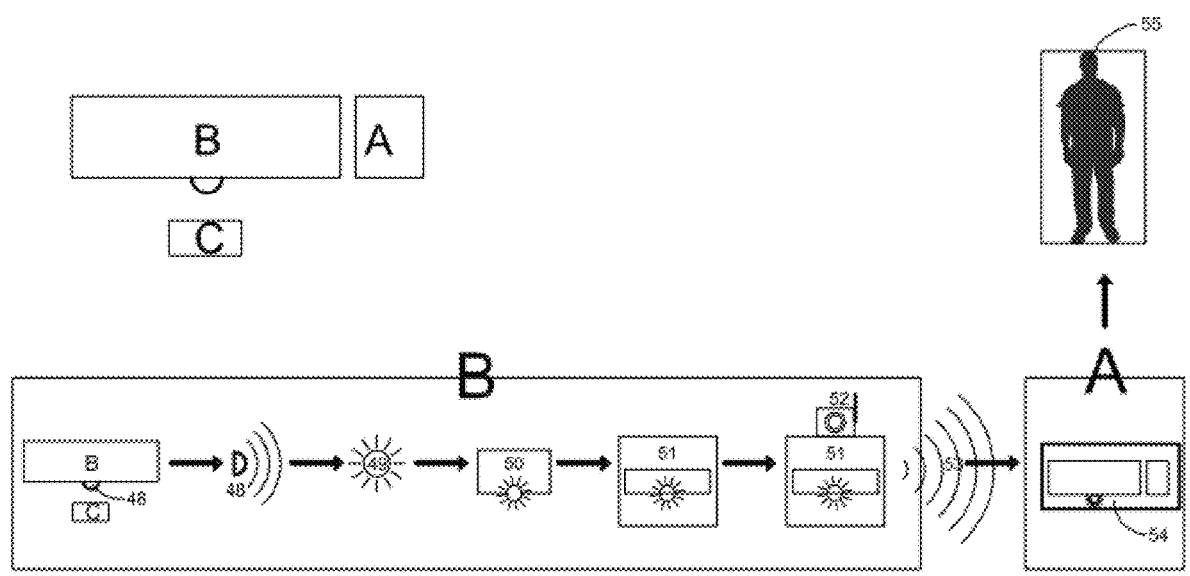
FIG. 15 illustrates an example of how the object detection sensor data can be communicated to the driver via a wireless camera transmitting a representative view to the cab.
Figure 16:
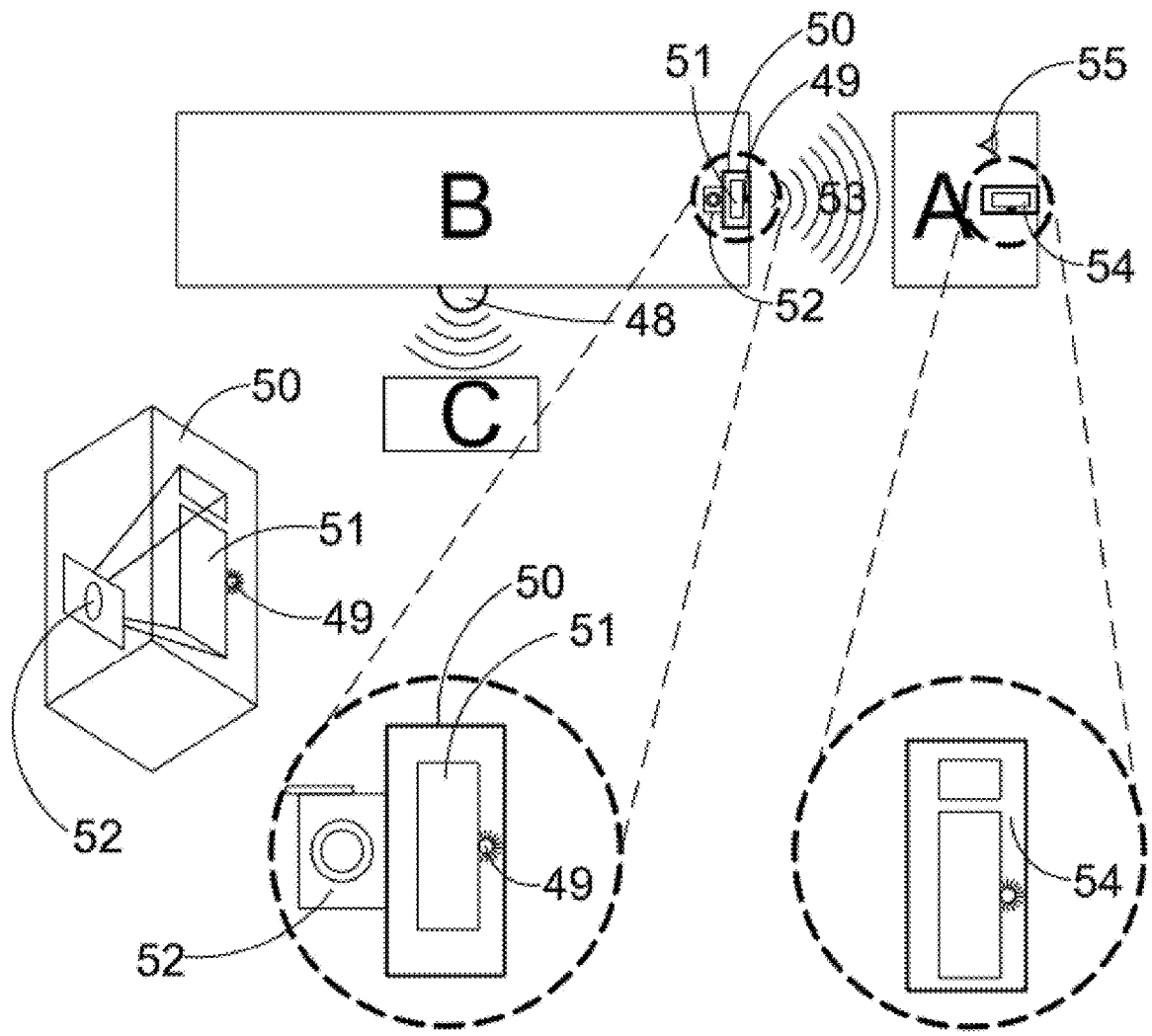
FIG. 16 shows a flow chart of the communication depicted in FIG. 13.

As illustrated on FIG. 15 and on FIG. 16, the exemplary system is composed of sensors, notification lights/signals, cameras, and displays, and uses a combination of wired and wireless communication in order to convey the current state of surrounding traffic to the driver (55). An array of sensor modules (48), mounted at various locations on the trailer, collect data from the surroundings. The collected data is then passed over hardwired connections to a central unit (3) for processing. Alternatively, the individual sensor modules (48) may carry out part of or all of the required data processing locally before transmitting to the central unit (50). In either case, the processed data is then displayed via the unit's notification lights (49) or an alternate signaling method. This display is sufficient to convey the presence or absence of obstacles (C) in the trailer's immediate surroundings. For instance, this display may represent a top-down view of the vehicle including LEDs (49) corresponding to the coverage zones of each sensor module in the array (51); these LEDs would serve to indicate the presence or absence of an obstacle (C) by their illumination state and/or color. For example, the LEDs (49) could change color to indicate distance from the obstacle (C). While approaching the obstacle, the corresponding LED (49) could transition from green at a long range, to yellow at a medium range, to red at a short range from the obstacle. This function would be especially relevant at the front and rear of the vehicle for docking and other slow speed maneuvers. The LEDs (49) could also behave differently based on the turn signal toggle, flashing urgently when an obstacle (C) is detected on the side of the vehicle where the turn signal is active.

This display area would not typically be directly visible to the vehicle's operator during use. It would primarily be viewed indirectly, by use of either a camera (52) or mirror system. In the case of a camera system, the central unit (50) would incorporate a camera (52) able to capture video of the display area (51). The video stream from the camera (52) is then transmitted wirelessly from the trailer transmitter (53) to a receiver (54) in the tractor which is connected to an in-cab display (54) viewable by the operator. The wireless receiver and display could be either separate units or incorporated into the one unit. In the case of a mirror system, the LED display areas (51) would be positioned on the trailer such that they would be visible as part of the standard mirror view on the tractor side mirrors. The display may also be subdivided such that the driver-side section would be viewable in the driver-side mirror, and the passenger-side section would be viewable in the passenger-side mirror.

As depicted in FIGS. 17 and 18, there are several alternative camera locations, the hitch-mounted camera housing is located on the ICC Underride bumper. This location will require a wire harness with an in/out connector allowing for parasitic power from an existing lamp (most likely one of the rear running lights of location I). Another alternative is to incorporate the camera within the running lamps resulting in a dual-function device meeting the running lamp requirements while providing a housing for one of the rearview cameras (location II). This design would allow for the use of the lamp's power source. The location III alternative is an integral camera within the rear corner marker lamps, using power from the lamps. Location IV is the upper center of the rear of the trailer, with either a camera integrated with individual marker lamps or within the outboard lamps of an upper ID bar (a single base with three ID lamps).

FIG. 18 displays three alternative positions for side-adjacent area-facing cameras. Location V is an intermediate side-marker lamp with integrated cameras and location VI is the front upper-corner marker lamps with integrated cameras. Both use the power source of the lamps. Location VII is at the wheel end of the trailer axle (single or tandem) using power generated by a hub mounted device (see U.S. Pat. No. 8,405,235 B2). Each alternative location of the cameras provides a useful vantage point that will allow a fleet to select the optimum image for their application.

A wireless rear vision system for a tractor trailer combination is composed of a camera array with wireless transmitter and a wireless receiver feeding video signal to an in-cab display to be viewed as a rear-view mirror. The camera array is incorporated into the trailer lighting in one of four ways: mounted to the ICC bumper, integrated with two lower running lights integrated with two upper corner marker lights, or integrated with upper central marker lights. The video signal from two cameras with conjoined fields of view (FOV) are stitched together in order to provide a near 180 degree FOV with less "fish-eye" effect than one wider FOV camera could provide.

Mounting the cameras and wireless transceiver on the ICC bumper provides wireless transmission advantages as it is not surrounded by metallic surfaces on all sides (see location I on FIG. 17). Power can be obtained by running a pigtail harness from the special in/out connector for running lights. Access to the turn signal wiring could also be included in this wiring harness. Two cameras mounted at an angle within this housing could provide the FOV and clarity advantages.

By incorporating the cameras into the marker lights, power and ground are easily available and the turn signal wiring is close-by (see location II on FIG. 17). If needed, an external antenna can be used to improve transmission characteristics.

The upper corner marker lights have easy access to power and ground (see location III on FIG. 17). A flexible antenna could protrude around the edge of the trailer for improved transmission characteristics. Access to turn signal information could be handled at the in-cab portion of the system.

The central clearance marker light strip located above the trailer door can incorporate two cameras mounted at an angle within a single housing (see location IV on FIG. 17). This higher vantage point provides an ideal view for judging the position of vehicles passing or being passed by the equipped tractor-trailer.

The dual camera array also can be leveraged to provide customized views during different lane change, merge, and turning situations. The turn signal is used to trigger a change in the view seen on the in-cab display. For example, when the left turn signal is activated the video stream from the camera oriented more toward the driver side of the vehicle would be displayed since that is the area of chief concern to the driver in that situation. Similarly, the passenger-side LCM maneuver is indicated by the right turn signal and the corresponding driver-side camera can be displayed in increased detail (see locations V & VI on FIG. 18).

A rechargeable battery could be incorporated into any of these cameras to monitor the door area of the trailer. An external sensor could trigger the camera to record to on-board storage when trailer doors are opened. This could help identify thieves and protect shipments.

Figure 19:
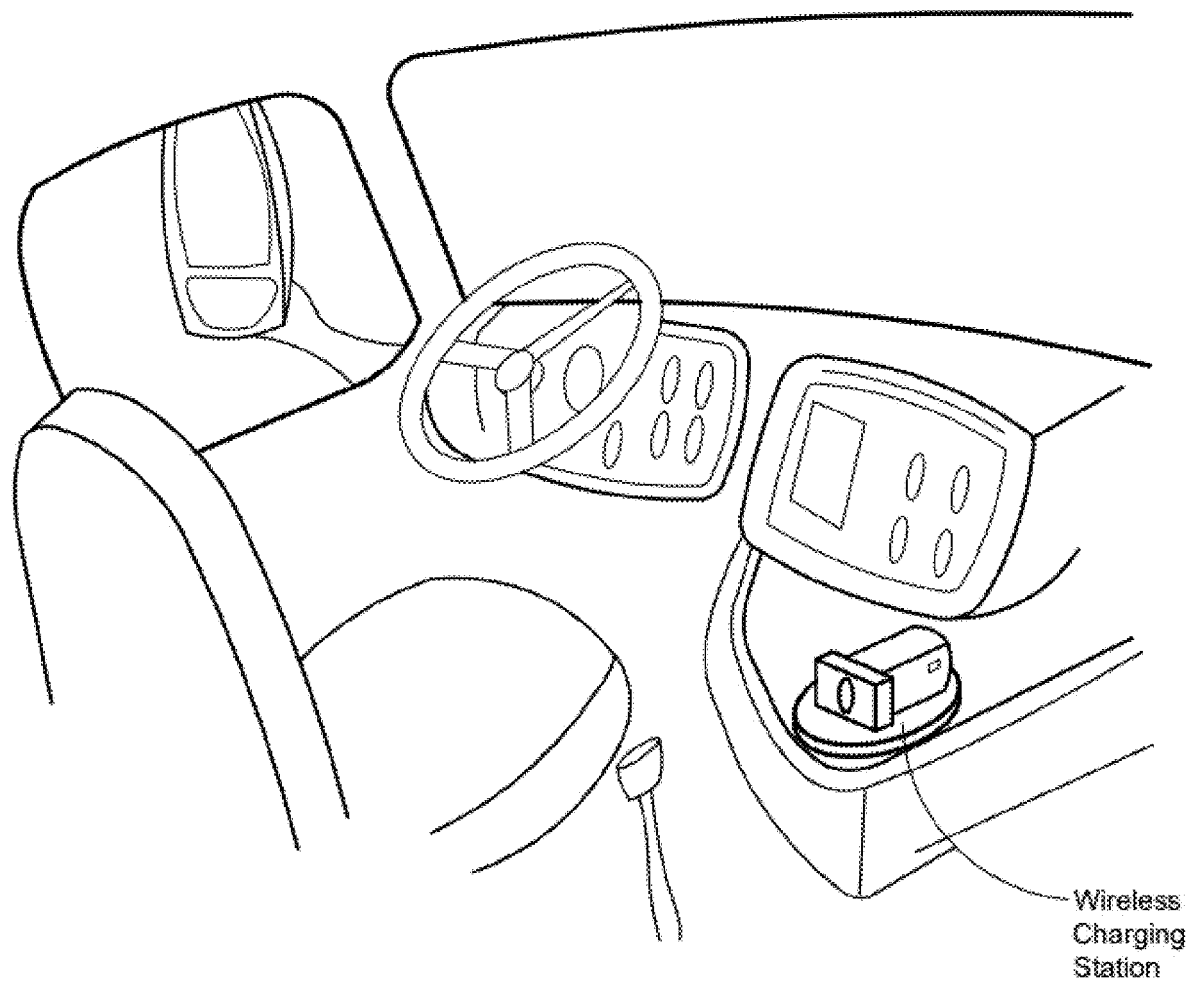
FIG. 19 shows a wireless charging station used to inductively charge the rearview camera.
Figure 20:
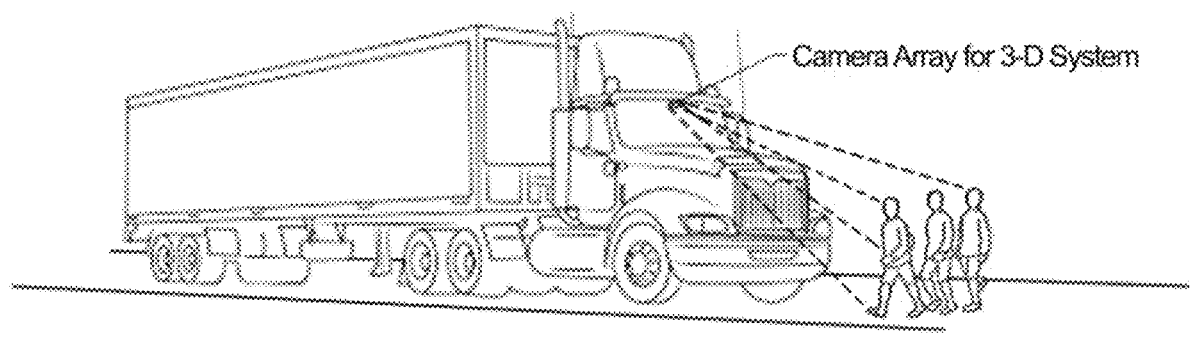
FIG. 20 shows a multi-camera array observing the external area in front of the vehicle.
Figure 21:
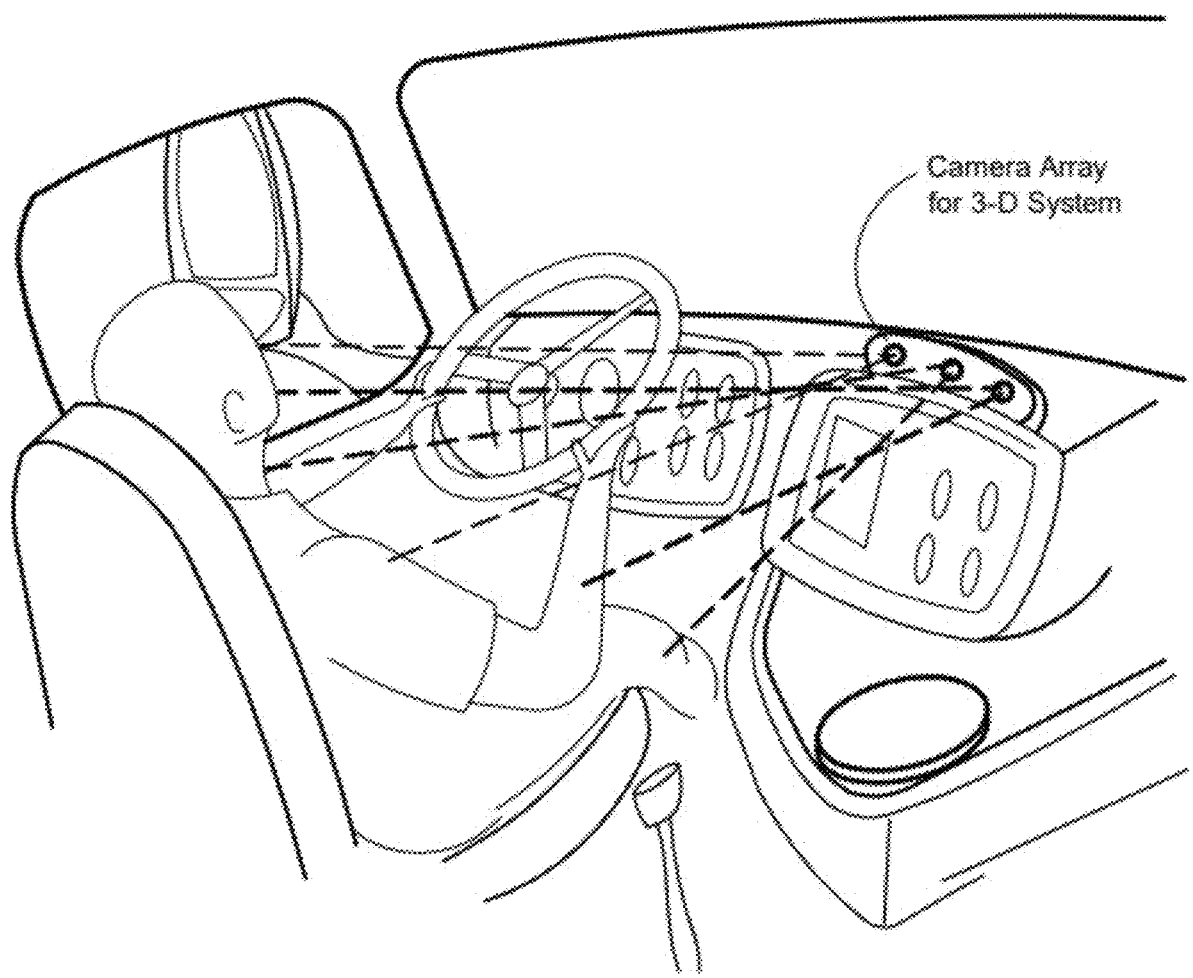
FIG. 21 shows a multi-camera array observing the driver and cab interior.

A wireless charging station can be located in the tractor to assure the portable camera is fully charged when positioned on the rear of the truck or trailer. FIG. 19 displays one possible location for the wireless charging station.

The use of a multiple cameras in an array at the front of the vehicle (FIG. 20) could provide improved performance and new functionality in a number of ways. Better low-light performance, wider dynamic range, and added 3D/binocular recording could improve the quality of the system's event-logging "dash cam" functionalities. By increasing the number of cameras, the total effective sensor area is increased, this leads to the better low-light performance and can improve the captured dynamic range. By combining the video stream from two slightly different perspectives, a 3D representation similar to that observed with human binocular vision can be created. The increased quality and perspective will allow for more accurate accident investigation, etc. Camera sensors with different lenses and wavelength sensitivities could be incorporated into the array in order to capture data complementary to the main sensors.

Camera arrays with differing focal characteristics could be employed together to allow for better/faster autofocus features.

A driver facing camera array (FIG. 21) could perform more accurate facial recognition tasks, potentially detecting signs of driver fatigue or distress. Optics based facial or iris recognition could also be used for driver log in to a user profile associated with the records being generated and enhance vehicle security. This technology could be used to prevent unauthorized drivers from operating company equipment or to ensure that authorized drivers use only the equipment that they are assigned.

The camera array, in combination with other sensors, could be used to map the depth of the view area.

Figure 22:
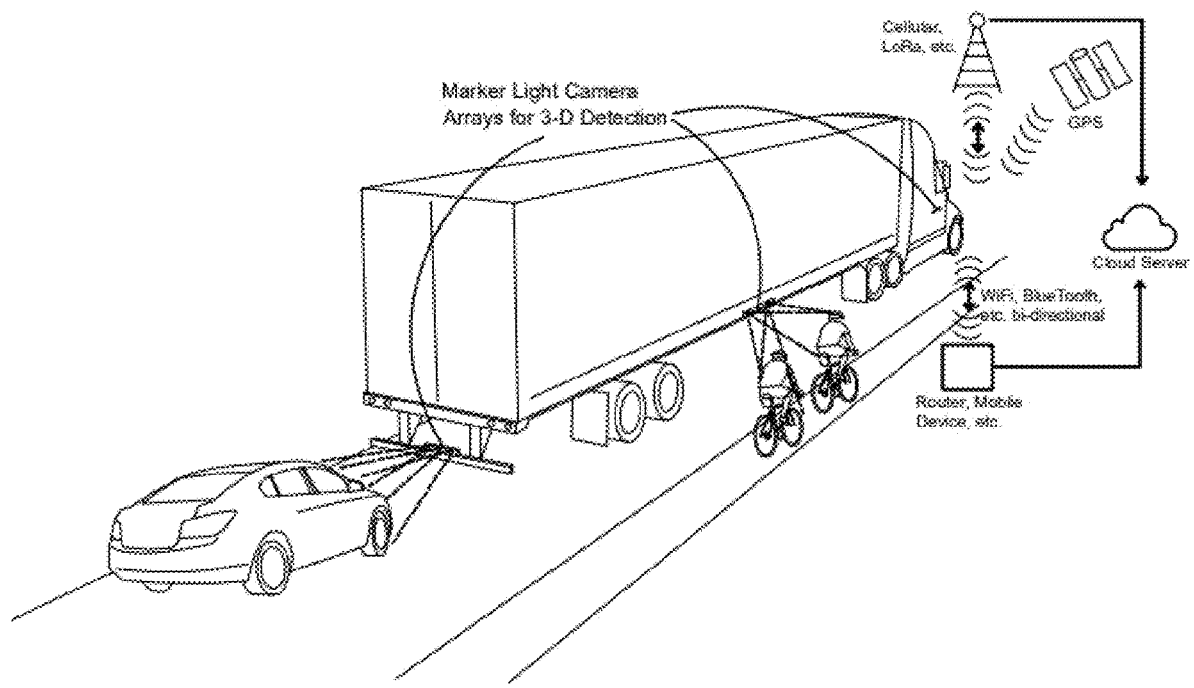
FIG. 22 shows three multi-camera arrays observing the area to the side and rear of the vehicle, as well as communication methods to and from these devices.

Several potential mounting positions for applications in the US Class 8 tractor-trailer market can be seen in FIG. 22. This technology/safety/video device will be packaged in a side marker, turn, or brake lamp and provide additional function while concurrently fulfilling the requirements of FMVSS-108 for lighting. Existing wiring provides power to the system when vehicle lighting is active. Additional wiring could be run to provide connection to keyed or constant power supply (pin 7 of SAE J560, blue circuit). Connection to pin 7 of the J560 connector also allows for data to be sent and received over power line carrier (PLC). PLC is commonly used to monitor trailer braking systems (ABS/EBS) as outlined in SAE J2497. In addition to electrical power, these mounting positions provide a good vantage point to collect valuable camera and sensor data. To supplement vehicle power, a photovoltaic cell could be incorporated into the exterior of the device to provide additional power for times that the vehicle is not in active use. These devices would also need to function as marker lights to provide conspicuity to the vehicle for low-light operation.

The camera array could also be accompanied by a host of other electronic components for communication, sensing, data storage, and processing. Sensors such as accelerometers, radar, Lidar, sonic, infrared, GPS, etc. could all be used to collect data about the vehicle surroundings and provide safety critical information or warnings to the vehicle operator. This data could be processed and stored locally in solid state memory, or be transmitted to cloud servers for analysis and reporting. This transmission could be carried out through a variety of wireless standards including, LoRa, cellular, Bluetooth, and WiFi with potential for to use of Message Queue Telemetry Transport (MQTT) MQTT is a protocol governed by the ISO/IEC PRF 20922 standard. It is described as:

"a Client Server publish/subscribe messaging transport protocol. It is light weight, open, simple, and designed so as to be easy to implement. These characteristics make it ideal for use in many situations, including constrained environments such as for communication in Machine to Machine (M2M) and Internet of Things (IoT) contexts where a small code footprint is required and/or network bandwidth is at a premium."

This protocol is typically used over Transmission Control Protocol/Internet Protocol (TCP/IP) networks to transfer small amounts of information while consuming little power. By using this protocol to communicate, the device can easily transmit its gathered sensor data over a cellular, WiFi, LoRa, or other method through a broker to be received by any number of subscribing devices.

The device could connect to a WiFi network using the following procedure in order to transmit gathered data. A fleet operating multiple truck yards could set up a dedicated WiFi router at the gate where all incoming and outgoing traffic will pass. The network created by this router could be concealed from common view by hiding its service set identifier (SSID). Each device used by that particular fleet would be set to automatically connect to a network with the Fleet's unique SSID when in range using a corresponding password. Additional routers, configured identically, could be set up to provide coverage to the rest of the yard. Each truck yard the fleet operates would employ this system so that the devices could easily offload data when brought into or out of the truck yards.

WiFi networks with alternative configurations could be connected to by using an application located on a smart device. When paired with the camera system through means such as Bluetooth, Near Field Communication (NFC) or QR code, the smart device could transmit the SSID and password of the desired network.

Not only could sensors be co-mounted with the camera array in the marker light area, but remote sensors could be located throughout the vehicle and communicate wirelessly (e.g. Bluetooth Low Energy, WiFi, MQTT) back to the system. These remote sensors could monitor areas such as tire pressure/temperature (315 or 433 MHz), axle loading, trailer door alarm, cargo status, braking (ABS/EBS), SAE J1939 communication, etc.

Widespread weather mapping across a network of interconnected roadways could be achieved by the use of a distribution of sensor clusters on a number of trucks. These trucks are on the move frequently and could gather weather or any other type of data whose relevant sensor could be housed on the vehicle. These vehicles would connect to each other as well as to stationary gateways through use of a Low Power Wide Area Network (LPWAN) protocol. This would allow for current and buffered historical data which had been gathered to be offloaded over LPWAN to then be analyzed in aggregate.

These various systems are controlled by an incorporated microprocessor and non-volatile flash memory. In order to transmit the data generated by a variety of sensors for diagnostic and optimization efforts, wireless communication capabilities including but not limited to cellular, Wi-Fi, or Bluetooth transceivers are incorporated into the device. This would allow for the offload of collected data and for communication of alerts to the back office or equipment operators, as well as communication with other vehicle electronic systems such as electronic logging devices (ELDs) used for managing hours of service and inspection records. Wireless communication would also allow for data to be sent to the device, such as reprogramming and updating. One example use case would be communicating authorization and cargo information via WiFi automatically to a border crossing checkpoint to improve efficiency and record-keeping. A similar practice could be implemented on company's truck yards, so that information can be transferred to and from the vehicle as it passes through the gate while entering or leaving the yard.

In order to extend the battery life of the camera system, and to allow for periodic wireless transmissions to be made when the vehicle is not under power, a solar panel could be incorporated into the design. These photovoltaics could alternatively be mounted remotely from the system element and then wired back to the device. This would allow for more flexibility in mounting schemes to maximize solar exposure.

Figure 23:
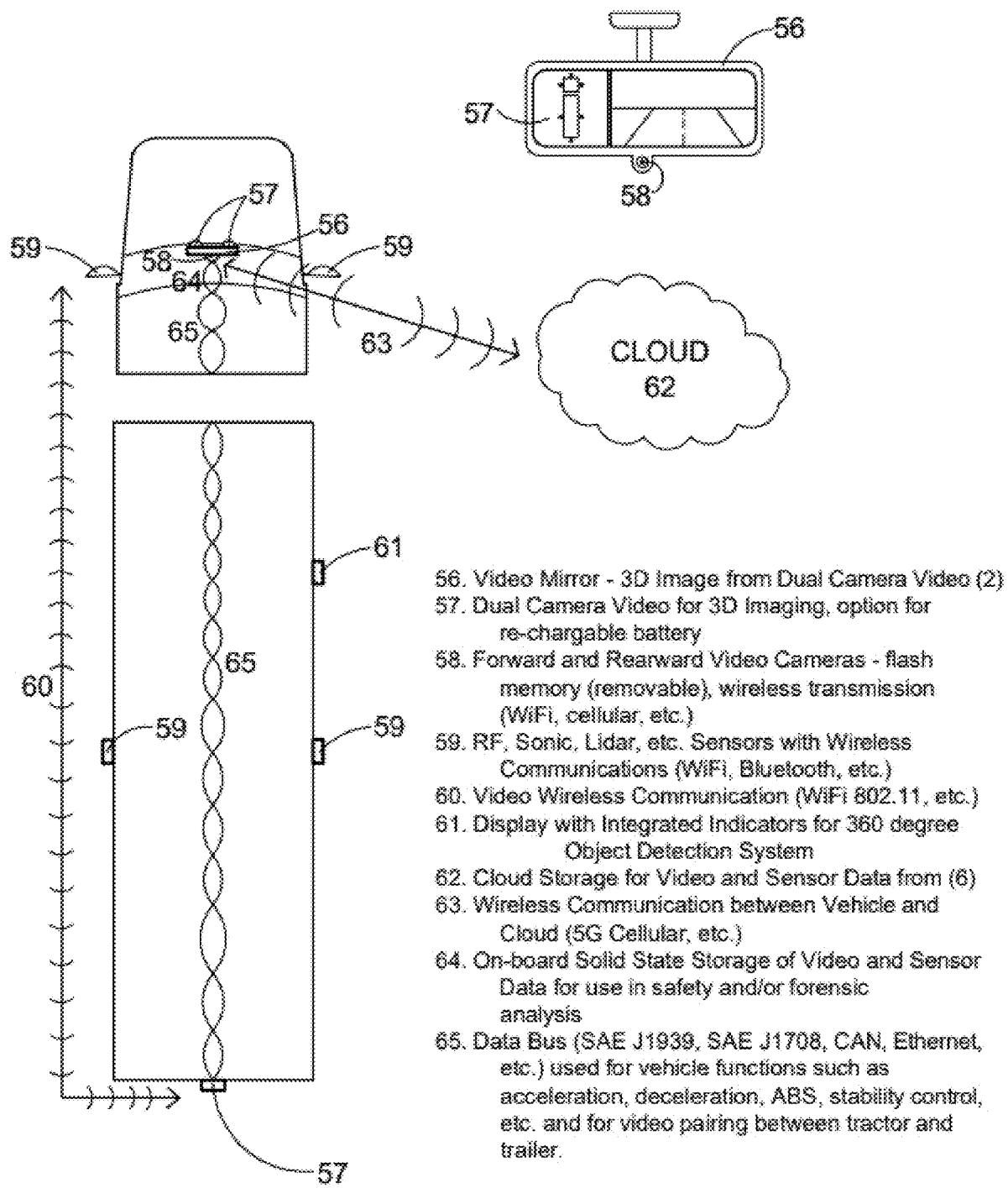
FIG. 23 is a schematic drawing illustrating the sensing and communication capabilities of one embodiment of the rearview vision system.

FIG. 23 is a schematic showing the various data and image gathering elements and their general location on the vehicle. The technology data, video images, and other safety information is transmitted to the mirror shaped monitor to provide the vital information to the driver. Additionally, all or a portion of the gathered information can be transmitted to cloud servers for use in forensic accident reconstruction efforts and in driver analysis.

Figure 24:
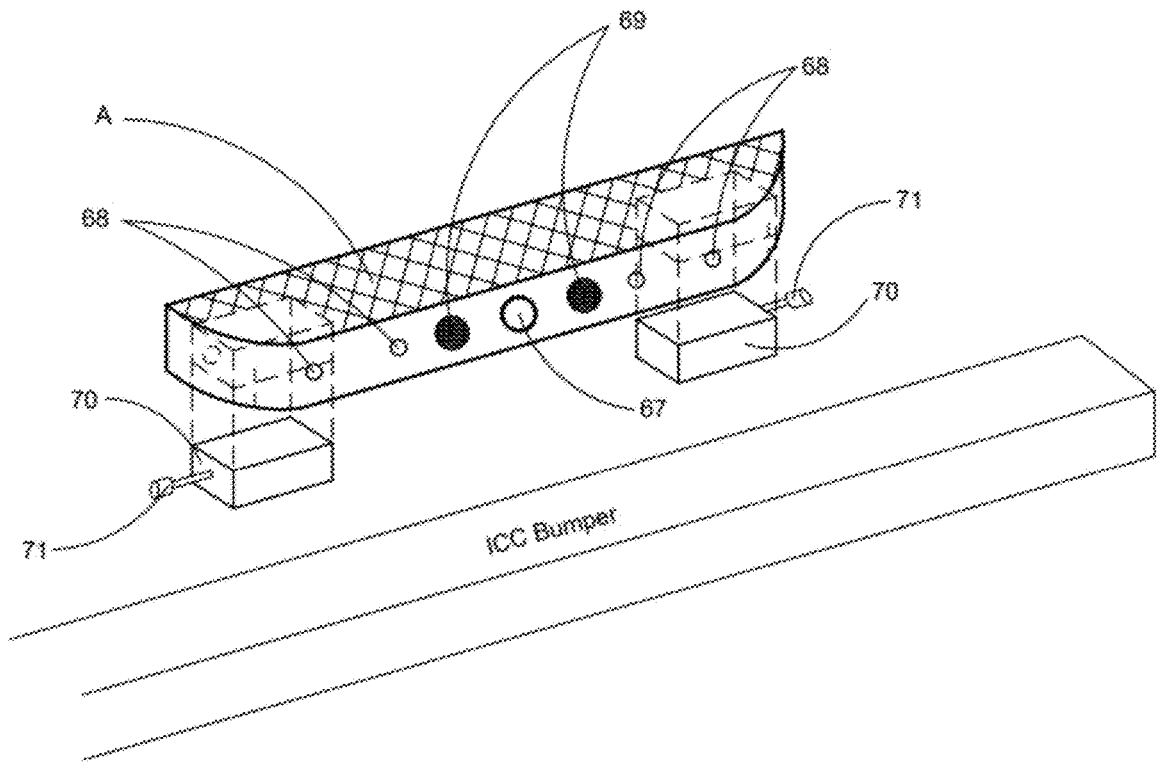
FIG. 24 shows an alternative mounting configuration for the safety control box as a step on an ICC bumper.

FIG. 24 shows an exemplary mounting configuration for the rearview camera system. The ICC Bumper commonly found at the rear of tractor trailers provides a consistent mounting platform for the camera. One or more powerful magnets are used to attach the device to the steel bumper. In order to enable easy installation and removal from the bumper, these magnets could rotate within their specially designed housing, effectively toggling on and off their magnetic effect (ref. U.S. Pat. No. 4,329,673). The lever or actuator to perform this toggling action could be secured by a locking mechanism to discourage theft, tampering, or unintentional actuation.

The housing of the Safety Control Box can be made of extrusions and cut longitudinally at various angles depending on the selection of cameras, sensors, radar, lamps, etc. chosen by the end user customer. One example shown on FIG. 25 could be mounted on the rear under-ride bar of the typical trailer and could be used as a step.

One configuration of the housing is shown in cross-section on FIG. 26 with angled end pieces for cameras to obtain a full 180 degree plus view for transmission to the driver. FIG. 26 also shows an example of how the extrusions and end pieces can be configured in various modules the house the specific components desired for a particular application.

Automatic Device Cleaning System:

FIG. 27 illustrates an automatic device cleaning system. Rear view cameras have already been mandated by NHTSA for use in the US light vehicle automotive market, and a growing number of heavy vehicles are being outfitted with camera technology as well. These exterior cameras are often subjected to harsh and dirty conditions (especially in heavy truck applications), which over time can create a layer of grime obstructing the camera view. To solve this recurring problem, camera wash systems have been developed to clean the camera's exterior lens surface using a mixture of pressurized air and washer fluid to effectively remove the obstructing material. A cleaning fluid nozzle (74) and air nozzle (75) work in concert to provide this functionality. To further increase effectiveness, this washer fluid can be heated before application using a custom heat exchanger (76) or commonly available heat exchangers such as diesel fuel coolers. This heating could be achieved by harnessing waste heat from vehicle systems such as the exhaust, emissions after treatment, heated fuel, radiator coolant, engine oil, and transmission oil on the tractor or the refrigeration system on the trailer. Once the surface has been successfully cleaned by the combined air/fluid spray, the washer fluid is removed from the mix and air only is used to dry the surface. Currently, these systems are manually activated only when the operator notices a level of obstruction unacceptable to them. Commonly, these systems also require a separate set of controls to be wired all the way from the unit up to the dash, where the driver can trigger the system manually. Alternatively, some of these existing systems operate on a configurable timer. By incorporating a local sensor into the design of the camera wash system, it can be automatically activated with no requirement of driver input or additional wiring to controls in the cab. This sensor (77), located directly next to each camera (78), optically determines the level of build-up accumulated on the exterior surface and when a threshold is reached, the camera wash system will be activated to clear away the debris with a fluid-air mix from the cleaning fluid nozzle (74) and air nozzle (75). Water droplets that impair the view due to rain or splash can be cleared away with pressurized air only. A sensor package (77) that could be used for this application combines a proximity and ambient light sensing module. Based upon the detected reflectance of emitted light from the optic window in front of the sensors (77), the level of obstruction due to surface debris can be determined as well as the nature of the obstruction (dirt, water droplets, etc.). In addition to automatic activation, the system can still be triggered manually from the cab by using a wirelessly connected device (79) in communication with the system's wireless transceiver (80) via Bluetooth, WiFi, or another wireless technology. The wireless device (79) used for this action could be a part of the vehicle's ELD system, which are required for the majority of truck drivers. This wireless transceiver (80) can also be used to link the system to the vehicle's telematics unit and allow for remote activation or the transfer of data such as activation record or diagnostic codes concerning the camera wash system health (low fluid levels, loss of pump prime, etc.) to the back office (81) via a cellular network (82) or satellite communication. Control of the transceiver, cleaning fluid pump, sensors, heating coil, and all other electronic components of the camera wash system are enabled by the system's microprocessor and memory (83).

Another activation method could be achieved by locating a wireless switch in the cab of the vehicle alongside the windshield wash controls, such that a wireless signal is sent to activate the camera wash system whenever the operator activates the windshield wash system.

Such an automatic cleaning system could also be deployed to keep headlights, marker lamps, ultrasonic sensors, Lidar sensors, camera infrared lighting, and other safety critical external components clear of debris which could impair their use. As an alternative to optically sensing the obstructing layer of debris, software could be used to analyze the video stream to detect the change in output over time when the vehicle is in motion. As a camera gets increasingly dirty, more and more pixels will remain the static, as no significant change in view is possible in an obstructed area. When a certain threshold is met, the camera wash system is activated to restore the view.

The optic sensor can be integral with each device as shown on FIG. 27 or a remote optic sensor could be located in a worst case position where the obstructing material that will diminish the function of the device will accumulate first. The sensor could be located where the turbulent eddy currents gather the air borne mixture of water and road grit and deposits the dirty film on the surface (for example, places like the rearward side of a mirror or the back of the trailer). There is an example of this process in the Truck Manufacturers Association report for the National Energy Technology Laboratory in April 2007 entitled "Test, Evaluation, and Demonstration of Practical Devices/Systems to Reduce Aerodynamic Drag of Tractor Semitrailer Combination Unit Trucks". The report illustrates this issue on mirrors but the phenomenon occurs on any trailing surface of the vehicle (e.g. back of trailer). This worst-case sensor would trigger the cleaning of all vision and sensing devices on the entire vehicle or on an associated region of the vehicle.

Figure 28:
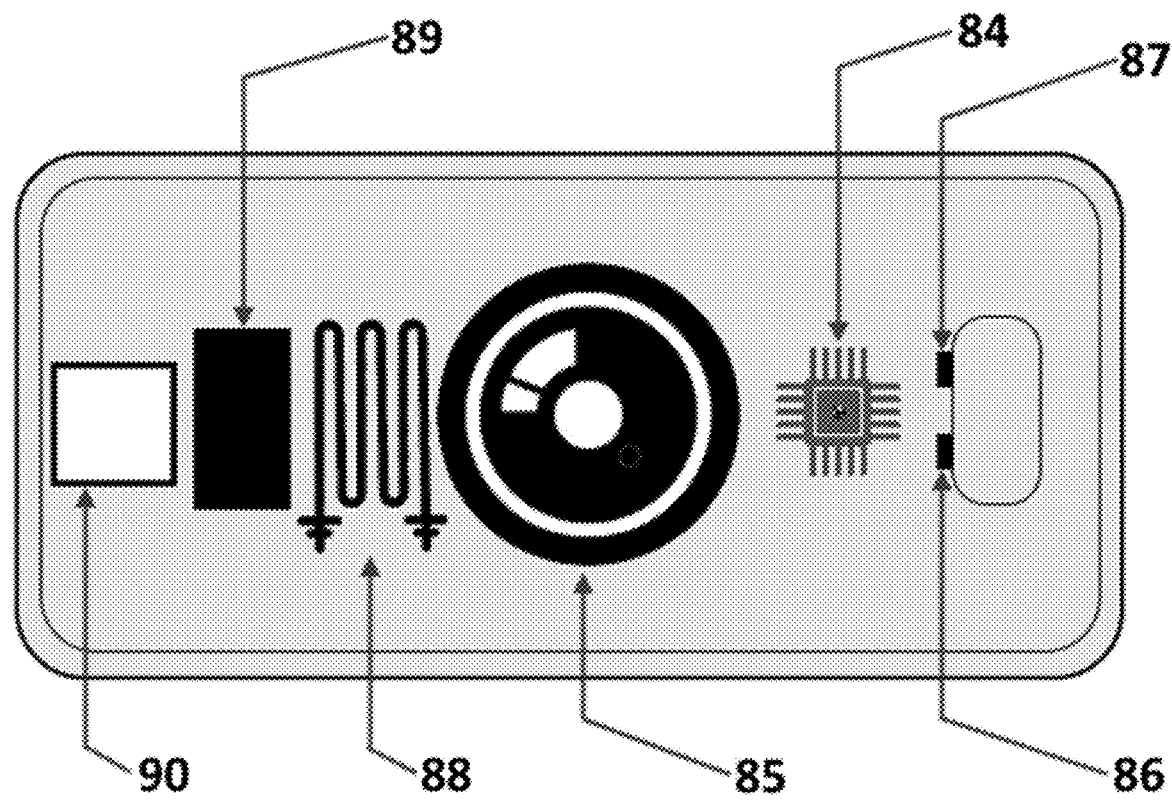
FIG. 28 shows elements of a sensor cleaning system with a primary and secondary sensor.
Figure 29:
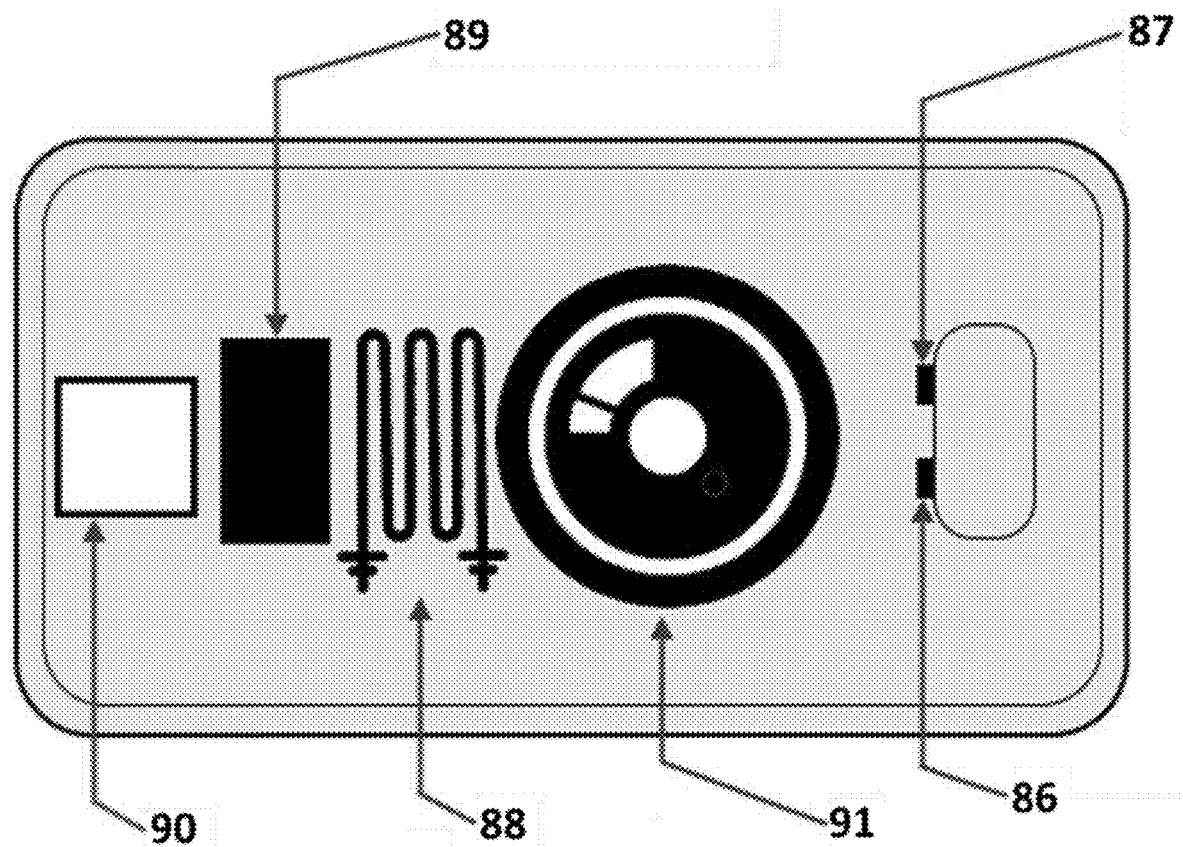
FIG. 29 shows elements of a sensor cleaning system with a primary sensor with self-diagnostic capabilities.

FIG. 28 illustrates an automatic sensor cleaning system. A secondary sensor (84), collocated with a primary sensor (85), monitors the impairment of sensing capabilities for the pair of sensors due to the build-up of dirt, ice, moisture, or any other foreign substance. This secondary sensor (84) could make use of elements such as photodetectors/photocells, laser rangefinders, photoelectrics, electro-optical sensors, radar, or other methods to determine the cleanliness of the primary sensor (85) region. Other conditions of the primary sensor (85) such as temperature, ambient humidity, ambient barometric pressure, location, etc. could also be determined by additional elements of the secondary sensor (84) (i.e. thermometer, hygrometer, barometer, GPS). With a combination of these sensed conditions, the type of sensor impairment and the current ambient conditions can be determined so that the appropriate action can be taken to clear the sensors. Change in GPS location provides vehicle speed which can be a factor to consider when optimizing the cleaning regimen applied (i.e. less/more air or fluid, etc.). The primary sensor (85) may be a video camera, radar, lidar, sonic, or any other type of sensor or surface (i.e. mirrors, headlamps, lights, windshields, etc.). Cleaning of the surface areas of the sensors is carried out using a variety of means including air jet (86), cleaning fluid jet (87), heat energy from a heating coil (88), and vibration from a vibration motor (89). The air jet (86) is used to clear away moisture and loosely attached dry particles from the sensors. The optional use of a poppet valve as part of the air nozzle design allows for the air stream to be pulsed on and off. In the context of heavy-duty vehicles with air braking systems, compressed air supply (typically at 120 psi) can be generated as needed using the vehicle compressor, so the air jet (86) can be used as frequently as needed. The cleaning fluid jet (87) is used to clear away more solidly adhered debris. The optional use of a poppet valve as part of the cleaning fluid nozzle design allows for the fluid stream to be pulsed on and off. A reservoir supplies the cleaning fluid necessary from a finite supply, therefore the use of this resource should be conservative in order to keep the cleaning system in full operation for as long as possible without resupply. A fluid level sensor (i.e. capacitive, hall effect, reed switch array with magnet float) monitoring the reservoir allows the system provide notification of the status of this resource via the system's communication interface (90). This wired or wireless receiver is capable of passing system status notifications to a connected computing device such as an ELD or telematics system and receiving data inputs and activation commands from such systems. A heating coil (88) provides deicing and drying capabilities to the system. Though this system can be activated as frequently as needed due to an unlimited voltage supply to the system (typically 12V DC, 24V DC, or 48V DC), the activation of the heating system should be limited to an as needed basis as determined by the sensors. This is because undue activation of the heating system could bake on debris on the sensor surface, causing them to be more difficult to remove. The activation of the heater could be based on sensed temperature and cycle off as soon as a temperature threshold was reached. This heating coil (88) or a separate heating coil can be used to heat the cleaning fluid used by the cleaning fluid nozzle for increased cleaning effectiveness. Vibration from the vibration motor (89) can be applied in order to shake free moisture and debris from the sensors, but also to dislodge moisture from the seals of the system casing in order to guard against liquid intrusion.

FIG. 28 shows a modification to the system shown in FIG. 27 wherein the primary sensor could carry out both its main sensing function (Automatic Driver Assistance, etc.) as well as self-diagnostic functions used for the activation of the sensor cleaning systems, allowing it to function as a self-evaluating primary sensor (91). This could be accomplished by software monitoring the sensor output which would be capable of recognizing a degradation of reading quality and respond by activating the cleaning system. Sensor readings recorded during activations of the cleaning system (activation type, duration, sensor impairment condition after, etc.) could be compared to the sensed conditions before the activation and be analyzed to find the most effective cleaning regimen based on starting condition. The system could be self-learning over time to employ the right cleaning method for any given condition.

Figure 30:
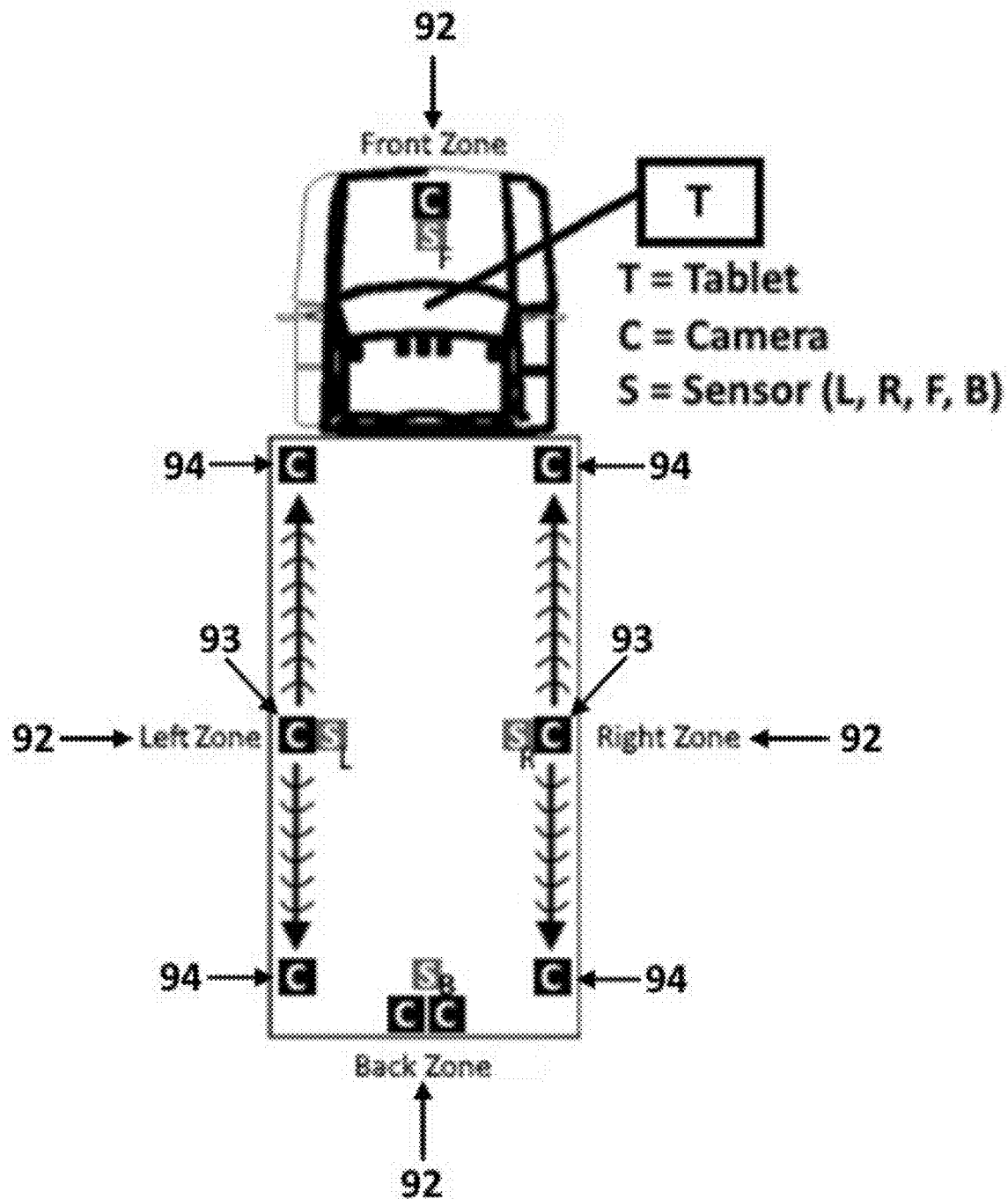
FIG. 30 depicts master cleaning control units governing the activation of non-control cleaning units within a defined zone.

FIG. 30 depicts how the control of a cleaning zone (92), such as one side of a vehicle, may be governed by a single control unit (93). This control unit (93) may be centrally located or located in an area of the zone most prone to becoming impaired. The positioning of the control unit (93) must sufficiently represent the rest of the sensors of the zone in order to prevent non-control units (94) from becoming impaired independently from the control unit (93) and as a result remaining impaired without being cleaned. When the sensors of the control unit (93) detect an impairment, the cleaning system is activated not only at the control unit (93), but at its connected non-control units (94). The connection for communication from the control (93) to the non-control units (94) could be wired or wireless (i.e. Bluetooth, WiFi, 433 MHz, etc.) as dictated by the installation conditions.

Figure 31:
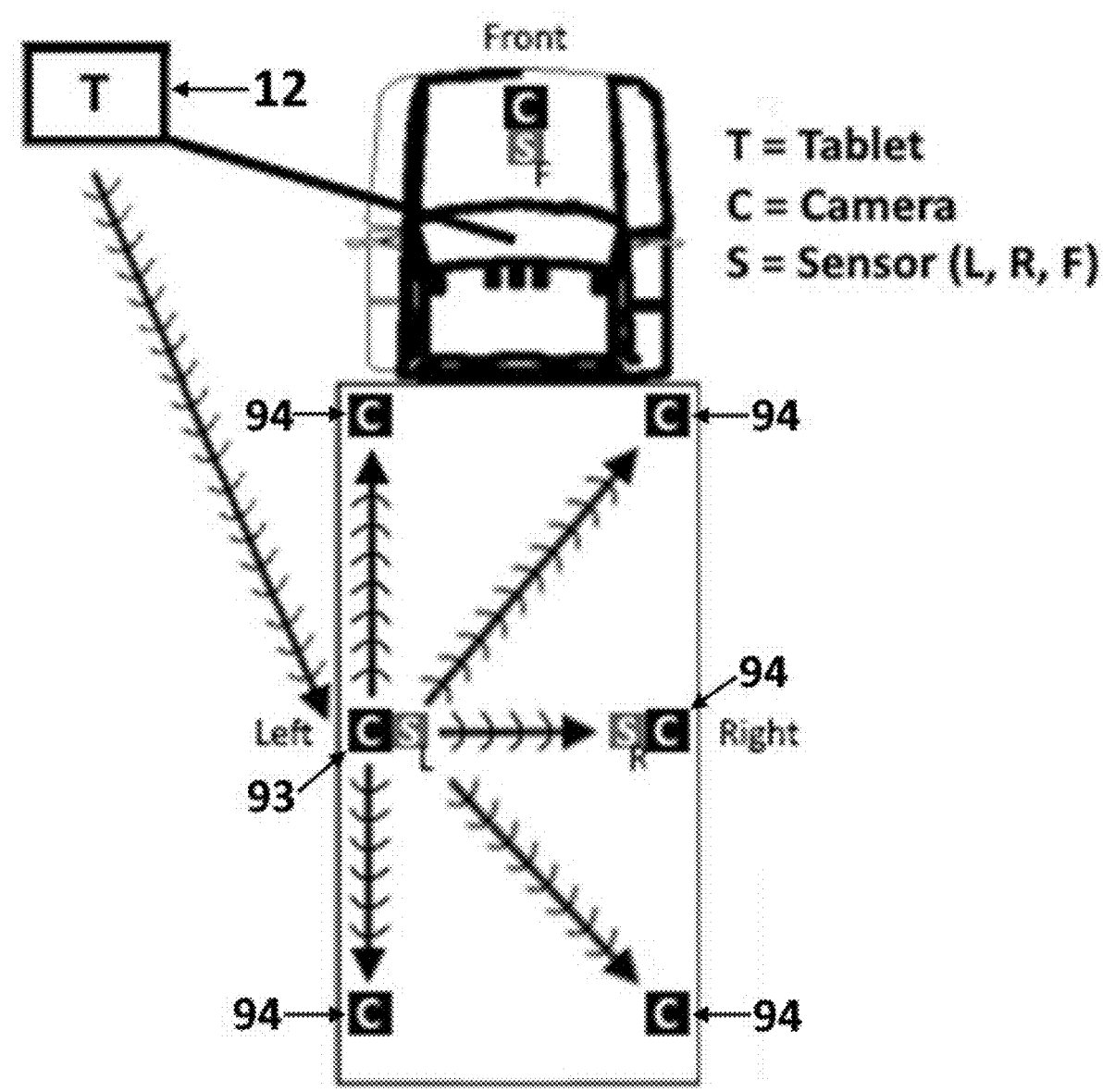
FIG. 31 illustrates a wireless control scheme for a network of sensor cleaning units.

FIG. 31 illustrates a wireless control scheme for a network of sensor cleaning units. In the commercial vehicle space, the Electronic Logging Device (ELD) mandate, 49 CFR Parts 385, 386, 390 and 395, has necessitated that most drivers have access to a portable computing device such as a tablet (12) in order to log their hours of service. This tablet (12) is typically is equipped for wireless communication methods such as Bluetooth, WiFi, and cellular which can be leveraged to communicate with and control the sensor cleaning system. In one such architecture, the tablet (12) communicates to and from a single control unit (93). This control unit (93) then relays commands to its connected non-control units (94).

Figure 32:
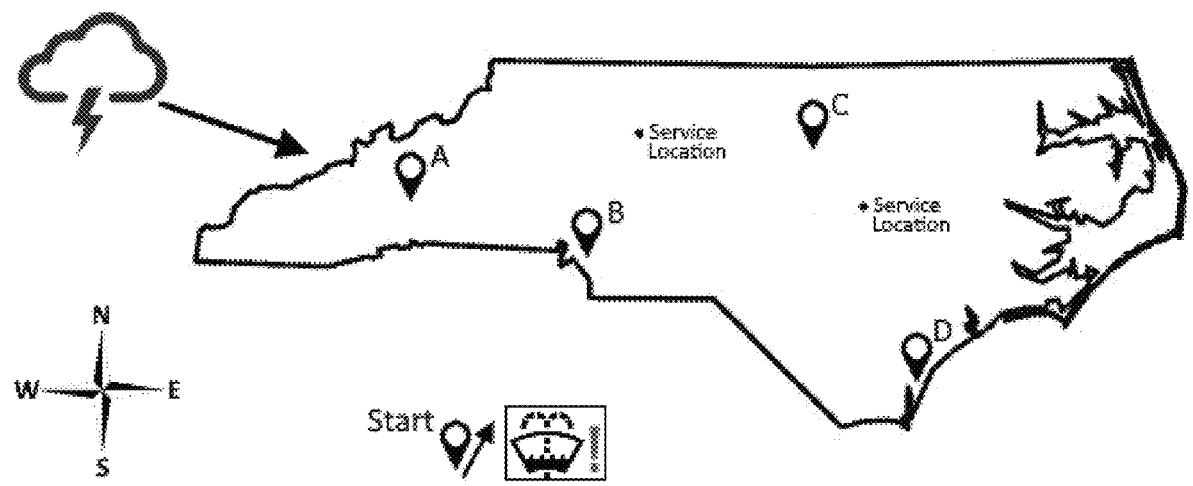
FIG. 32 represents a route planning situation in which sensor cleaning factors impact routing decisions.

FIG. 32 represents a situation where routing decisions would be impacted by a combination of weather and the availability of cleaning fluid. For vehicles with Advanced Driver Assistance Systems (ADAS) or autonomous operation, the impairment of a sufficient number of these critical sensors could entirely disable these functionalities. It is therefore worthwhile to plan routing based upon inclement weather and the availability of sensor cleaning resources such as cleaning fluid. The vehicle is approaching from the South with a low amount of washer fluid left in its reservoir. Inclement weather is approaching from the Northwest. The vehicle is bound for destinations A, B, C, and D with the opportunity to receive service and buy additional cleaning fluid at the two locations marked. Commonplace routing algorithms would prioritize the shortest route based on travel times between these destinations. The algorithm appropriate for this routing situation should include factors such as weather forecast and the addition of stops at the most convenient service locations as vehicle resources are consumed. Weather and service location information can be obtained from a cellular connection to internet servers, and vehicle condition information such as cleaning fluid reserve levels can be obtained from a connection with the vehicle data bus or through a connection to the vehicle telematics system. Sensors will require additional cleaning when operating under inclement weather conditions and ADAS or autonomous driving functionality may be degraded, therefore routing that minimizes operation during inclement weather should be prioritized. Under this methodology, the shortest route may be passed over in favor of a longer route that better meets the trip requirements.

Trailer Reverse Lighting System and Associated Pairing Methods:

FIG. 33 depicts a trailer reverse lighting system which activates based upon wireless communication from a tractor-based module. In the North American tractor trailer market, standard trailers are not wired for reverse lighting, as this is not a pin of the SAE J560 connector (95) used across the industry. In order to provide this functionality, a transceiver installed on the tractor (96) communicates with a lighting module installed on the trailer (97). The tractor module (96) can be packaged in a reverse lighting housing found on the rear bumper of the tractor and include FMVSS compliant reverse lighting. This provides for standardized easy mounting of the tractor module (96) and ready access to the reverse wiring found there. By monitoring the activation of the reverse and brake lighting wiring, the tractor module (96) can transmit the vehicle's reverse status to the trailer module (97) for activation of the trailer reverse lighting or other functions. The trailer module (97) is connected to the key on power (pin 7 of the SAE J560 connector (95)) and the brake lighting (pin 4 of the SAE J560 connector (95)) wiring. Wireless communication between the tractor module (96) and trailer module (97) provides reverse status to the trailer module (97).

Figure 34:
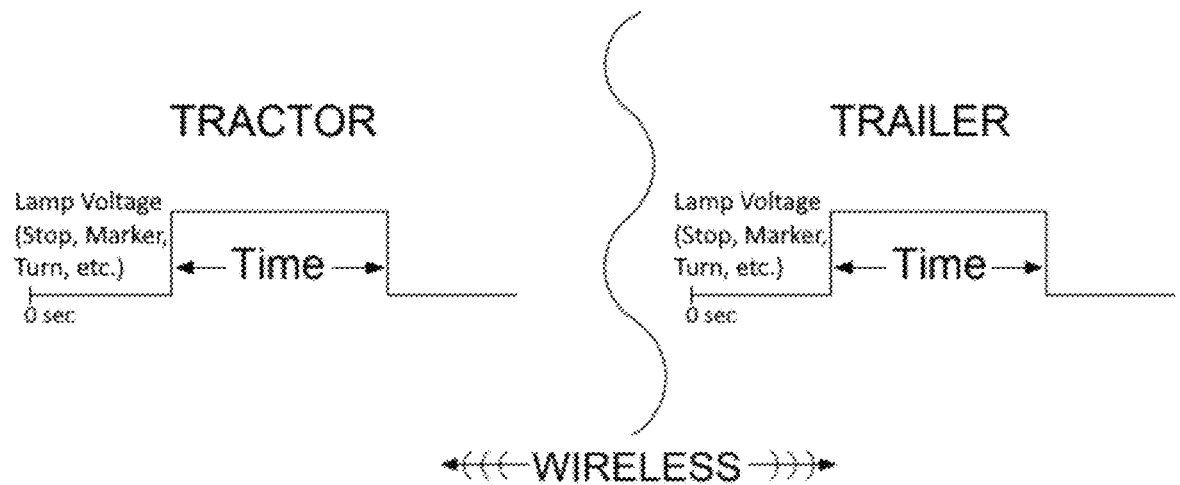
FIG. 34 shows information available simultaneously on the tractor and trailer lighting wiring during normal vehicle operation which can be used for wireless device pairing.

FIG. 34 depicts the information available simultaneously on the tractor and trailer brake wiring during activation of the braking system. Automatic wireless pairing of the two modules can be carried out by virtue of their shared connection to the vehicle combinations stop lamp wiring. When the tractor trailer electrical connector (SAE J560, ISO 1724, ISO 11446, etc.) (95) is connected during vehicle hookup, the trailer module (97) will receive power and boot up in pairing mode. As the driver activates the vehicle brakes to begin moving the vehicle, both the tractor module (96) and the trailer module (97) will have access to the frequency and duration of the stop lamp activation. The tractor module (96) will broadcast a pairing signal containing this frequency and duration information. The trailer module (97) will be monitoring for wireless pairing broadcasts with matching stop lamp activation information upon being powered up. The braking data under these normal operating conditions should provide sufficiently distinct data sets that would prevent pairing between the tractor and trailer modules of unconnected vehicle combinations. Through driver training, these data sets could be improved by having drivers pump their brakes in a random pattern before putting the vehicle in gear. A similar pairing process could be carried out substituting data from the brake wiring with data from the turn signal or marker light wiring instead. These pairing methods are equally valid for use with other systems such as tractor-trailer data bus relay products (wireless bridge) and trailer based camera systems.

Figure 35:
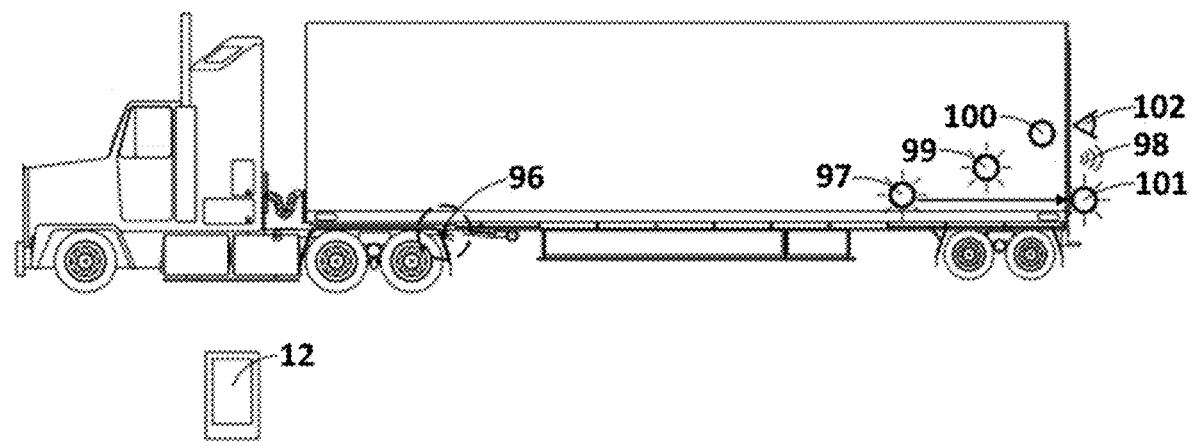
FIG. 35 illustrates additional functionalities to be implemented alongside the trailer reverse lighting system.

FIG. 35 illustrates a variety of other functionalities the trailer module (97) could perform in conjunction with the tractor module (96) or an ELD/mobile device (12). A variety of other functionalities could be implemented using the trailer module (97) beyond reverse lighting. A backup alarm (98) could be activated on the trailer to warn those in the surrounding area while the vehicle is in reverse. FMVSS compliant marker lighting (99) or flashing turn/caution lighting (99) could be included. Marker lighting (99) would remain lit whenever the module was powered, while the turn/caution lighting (99) would activate when the associated turn/caution trailer wiring is activated. Caution lighting (99) could be triggered when an engine fault code associated with engine depowering is detected. Infrared illumination (100) to provide lighting for low-light mode vehicle camera systems, such as the Stoneridge's MirrorEye®, could also be included. During night-time backing situations, infrared flood lighting (100) to the side and rear of the trailer could provide clearer imaging for the driver viewing the camera feed on the in-cab monitors. Because this infrared lighting (100) would be invisible to the human eye, activating this flood lighting while travelling on roadways during low-light situations could provide the driver with clearer imaging while not affecting other drivers on the road at all.

Secondary reverse lights (101) located on the rear or opposite side of the trailer could be hardwired from the trailer module (97) and be activated based upon the trailer module's access to reverse status information from the tractor module (96). The reverse lighting modules (97, 101) located around the trailer could provide valuable lighting for technicians carrying out vehicle repair or inspection. In order to carry out this function, the lighting (97, 101) can be activated by wireless communication with ELD tablet or other Bluetooth capable mobile device (12). An application on the ELD tablet or mobile device (12) connects directly to the trailer module (97) and can toggle the lighting (97, 101) on or off. For compliance with FMVSS standards, reverse lighting cannot remain active while the vehicle is travelling down the road. In order to prevent this out of compliance condition, a connection with the ELD tablet or mobile device (12) responsible for toggling the lights must be maintained for the lights to remain on, and a GPS connection on the mobile device (12) must be active in order to monitor speed. If the mobile device (12) begins to travel at a speed greater than a preset threshold (such as 10 mph), then the app will automatically deactivate the lighting (97, 101). Alternatively, a GPS antenna incorporated into the trailer module (97) could monitor vehicle speed and deactivate the reverse lighting (97, 101) when travelling above the speed threshold.

The trailer module (97) could have a wired connection with a trailer camera system (102) and use its wireless communication connection to the tractor module to stream video data to a connected display in the cab of the tractor. The activation of a camera system based upon the sensed reverse status of the vehicle combination is also possible.

Figure 36:
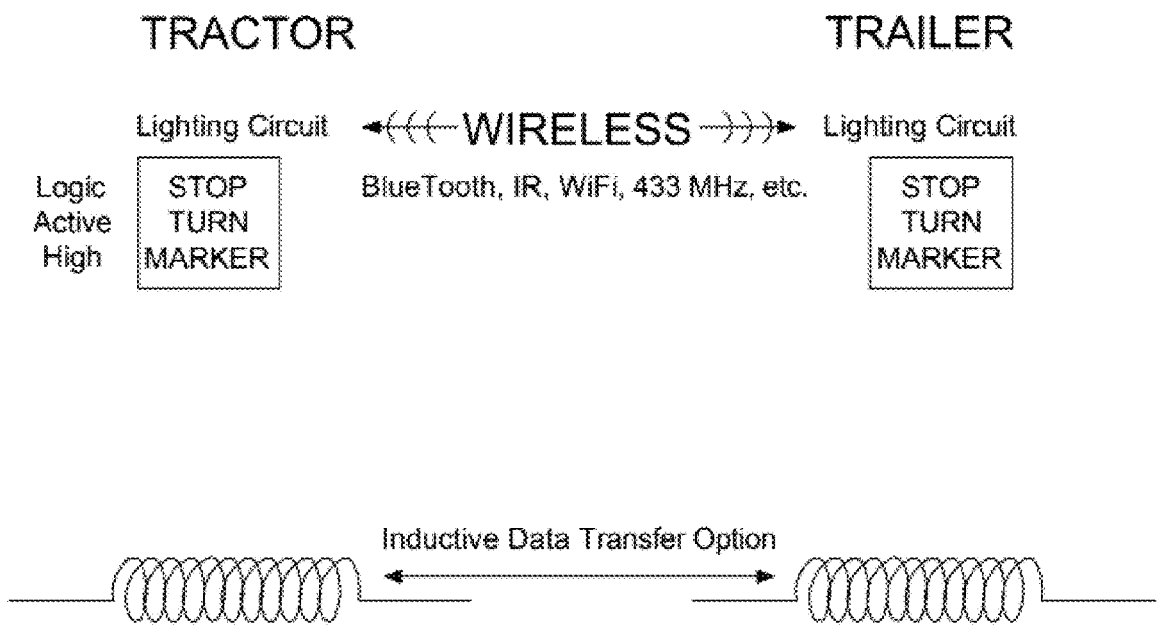
FIG. 36 shows the cooperation between pinless power and data tractor trailer connection and lamp wiring activation timing pairing method to pair wireless devices.

FIG. 36 shows the how the lamp wiring activation timing pairing scheme could work alongside contactless connector systems. Through the use of matched inductive coils in the receptacle and connector, both power and data transfer can be carried out without the physical contact of pins. The use of these fully sealed contactless connections reduces corrosion concerns associated with typical pinned connections. Such a data and power connection between the tractor and trailer would provide another route for vehicle identification and pairing data to pass over a hardwired connection between the tractor and trailer. Using the exchanged vehicle identification information, the tractor and trailer based modules could initiate wireless pairing with the unit associated with the other vehicle. Synchronized electrical activity on the tractor and trailer lamp wiring (stop, turn, marker, etc.) could serve as a second validation of pairing information passed over the pinless data connection between the tractor and trailer.

Location Based Inspection Verification:

Increasing accuracy of GPS location service opens up the possibility of tracking an inspector as they make their rounds, and verifying the time spent at each inspection location. As part of the daily requirements for the commercial operation of heavy duty vehicles, a walk around inspection is required along with the completion of a Driver Vehicle Inspection Report (DVIR).

Figure 37:
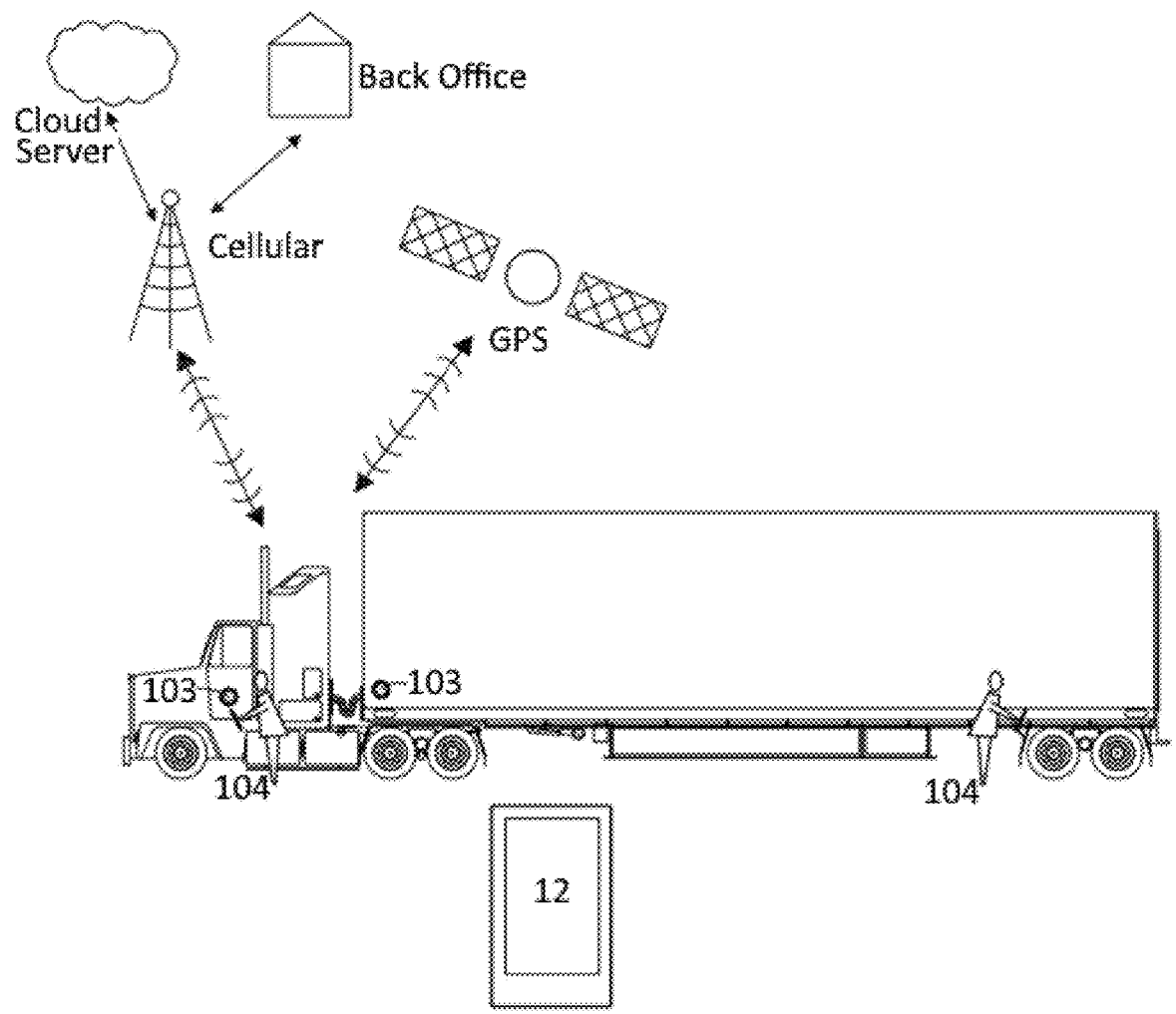
FIG. 37 illustrates the use of a mobile device's GPS location information combined with the scanning of vehicle identification tags to verify and streamline inspection reporting.

FIG. 37 shows how a tablet or smart phone (12) could be used to both verify the completion of vehicle inspections and to streamline the inspection reporting process. Many of the common data fields of the inspection report such as date, time, location, employee/badge information, and carrier information could be automatically filled with information available to the mobile device (12). Also vehicle numbers of the tractor, trailers, and dollies being inspected could be determined and populated onto the report by scanning a vehicle identification tag (103) mounted to each vehicle (i.e. QR or NFC) with the mobile device (12). The make/model and other information of each scanned vehicle could also be pulled from the cloud and populated into the DVIR when the vehicle identification tag is read.

With the vehicle identification tags (103) mounted in a standardized and consistent location on each vehicle type, it is possible to establish the layout of the vehicle combination being inspected. This can be achieved by noting the GPS coordinates when the first and second vehicle identification tags (103) are read and combining that information with the identified vehicle's known dimensions to create a map of the vehicle's expected position. By knowing the location of two points on a known shape (assuming the vehicle is aligned and not angled at its articulation), a two dimensional map of the vehicle combination can be created. The accuracy and reliability of this method could be further increased by placing two identification tags (103) at standardized positions on each vehicle, which could account for articulated vehicles. As the inspection proceeds, the inspector (104) should be seen to move around the perimeter of the mapped vehicle or vehicle combination, and the amount of time spent at key inspection locations can be recorded and analyzed to help ensure adequate care is being taken in the inspection of the vehicles.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A method for enhancing situational awareness in a transportation vehicle comprising a tractor and a trailer, comprising:

strategically locating a plurality of sensory communication devices on the vehicle;

operatively connecting the sensory communication devices to a user network;

after the vehicle is in motion, comparing a velocity of the tractor and a velocity of the trailer;

when the velocity of the tractor matches the velocity of the trailer, automatically pairing the sensory communication devices with a computing device connected to the user network;

activating at least one of the sensory communication devices upon a triggering event;

transmitting a vehicle data signal comprising vehicle information from the activated sensory communication device to the user network; and using the computing device to access the user network, receiving in real time the vehicle information transmitted by the activated sensory communication device.

\* \* \* \* \*